United States Patent [19]

Darden et al.

[11] 4,295,194
[45] Oct. 13, 1981

[54] ADAPTER UNIT FOR USE IN A DATA PROCESSING SYSTEM FOR PROCESSING A VARIETY OF REQUESTS

[75] Inventors: Boyd E. Darden, St. Petersburg, Fla.; Henry F. Hartley, Lowell, Mass.

[73] Assignee: Honeywell Information Systems Inc., Waltham, Mass.

[21] Appl. No.: 73,056

[22] Filed: Sep. 6, 1979

[51] Int. Cl.³ .............................................. G06F 9/46
[52] U.S. Cl. ................................................. 364/200
[58] Field of Search ... 364/200 MS File, 900 MS File

[56] References Cited

U.S. PATENT DOCUMENTS

| 3,178,689 | 4/1965 | McKenna | 364/200 |
| 3,714,635 | 1/1973 | Hamilton et al. | 364/200 |
| 4,099,255 | 7/1978 | Stanley et al. | 364/200 |

*Primary Examiner*—Gareth D. Shaw
*Assistant Examiner*—Thomas M. Heckler
*Attorney, Agent, or Firm*—Faith F. Driscoll; Nicholas Prasinos

[57] ABSTRACT

A data processing system includes a central processing unit, a main store and device controllers which couple to a bus system. Each controller has a number of device adapter units. One controller includes a real time adapter unit which instead of being connected to control a peripheral device is connected to provide a timer facility for use by the central processing unit (CPU) in executing tasks. The real time adapter unit includes a microprocessing section, a timer section, and a module time of day section. The time of day includes circuits which are connected to provide accurate and reliable time of day values. The timer module section includes circuits which are connected to provide variable time intervals. The circuits of both sections are connected to the circuits of the microprocessing section. In response to a number of different commands received from the central processing unit, the microprocessing unit (MPU) of the microprocessing section loads the various registers included within the timer module section to establish a desired interval at which it is to monitor the time of day operation of the time of day section. When the microprocessing unit establishes that the particular time of day operation specified by the central processing unit has been completed, it generates signals for notifying the central processing unit.

31 Claims, 5 Drawing Figures

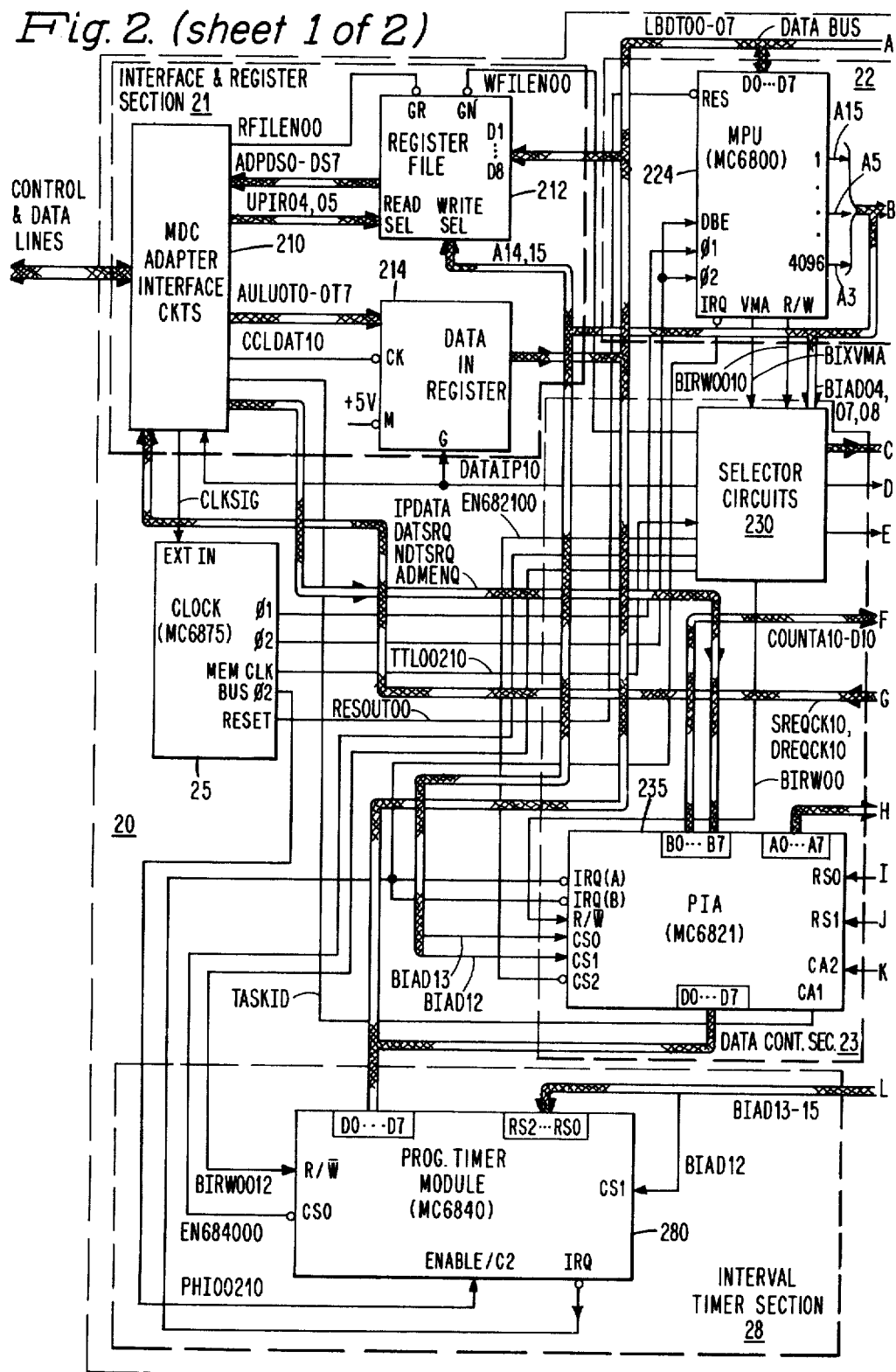
Fig. 2. (sheet 1 of 2)

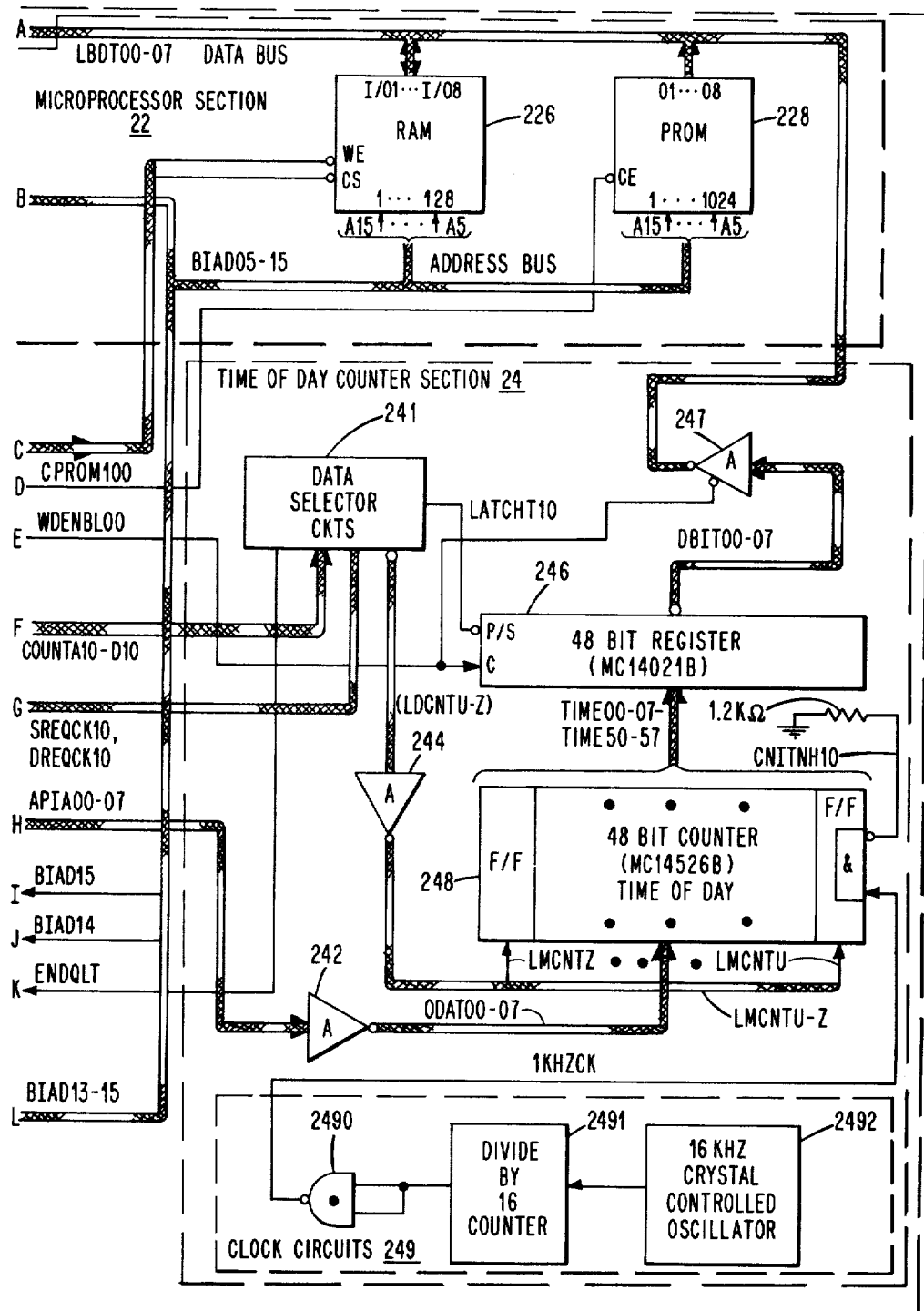
Fig. 2. (sheet 2 of 2)

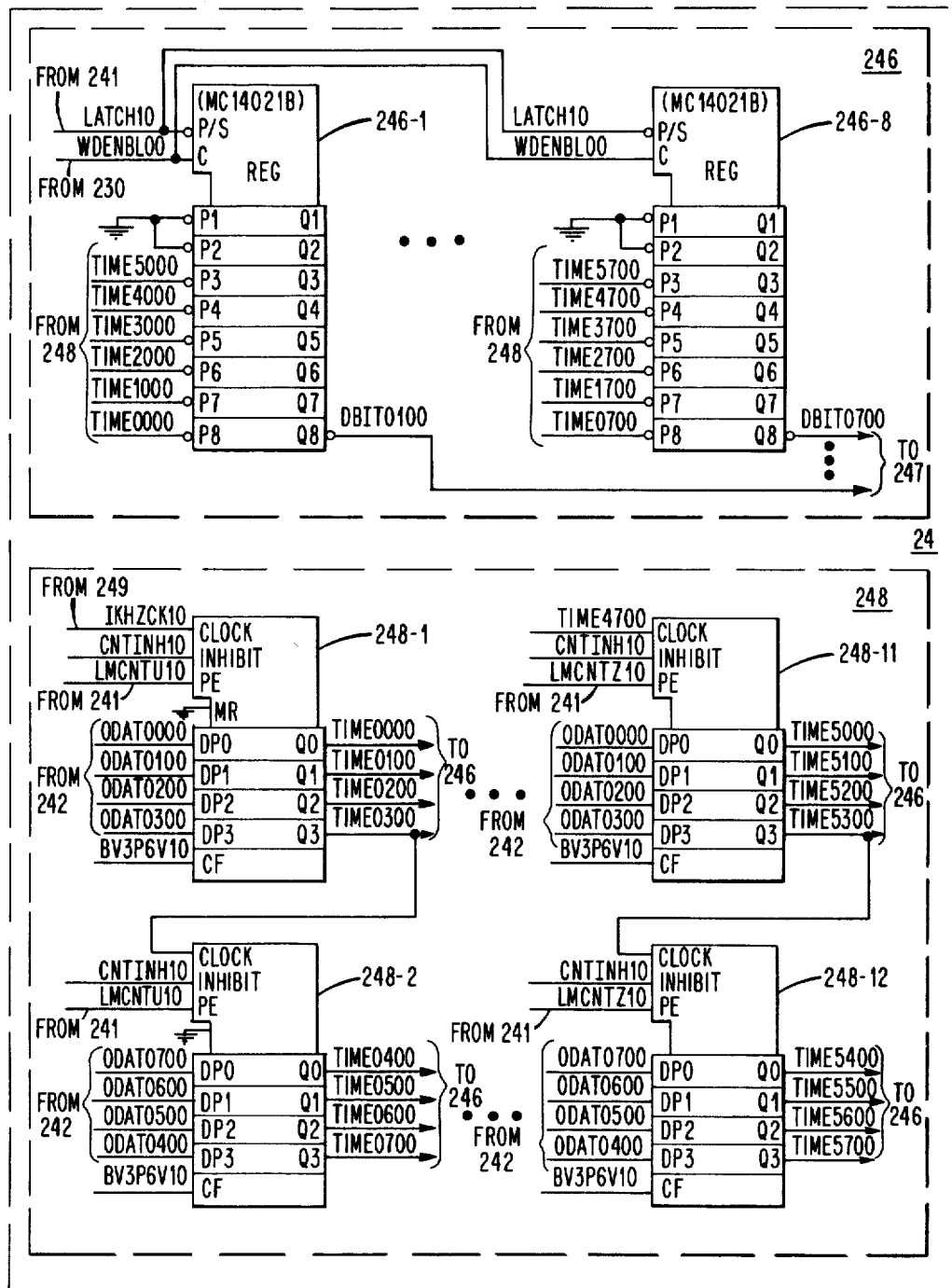
Fig. 3c. (sheet 1 of 2)

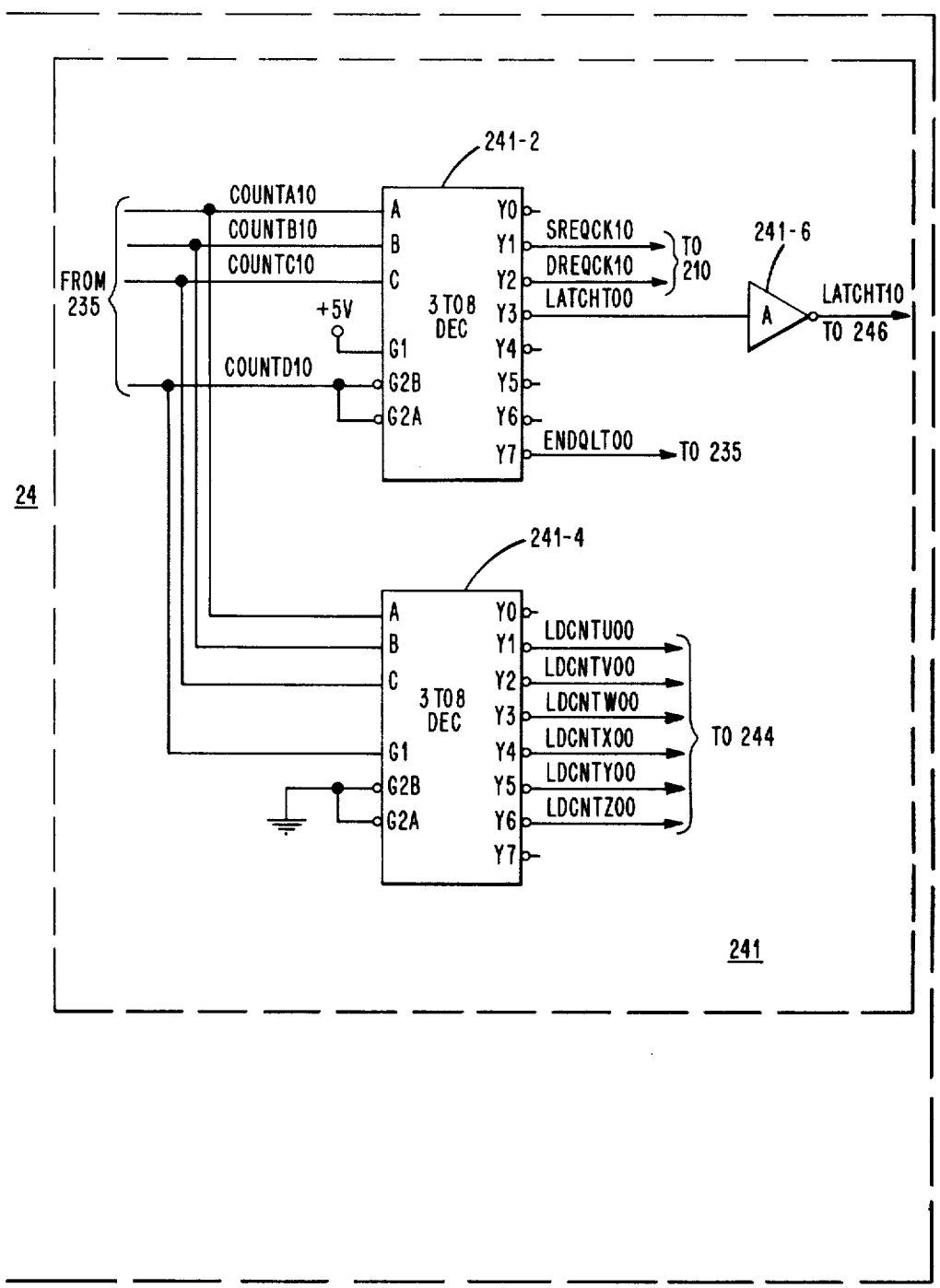
Fig. 3c. (sheet 2 of 2)

ADAPTER UNIT FOR USE IN A DATA PROCESSING SYSTEM FOR PROCESSING A VARIETY OF REQUESTS

RELATED APPLICATION

"A Real Timer Adapter Unit for Use In a Data Processing System", invented by Boyd E. Darden and Henry F. Hartley, Ser. No. 73,058, filed on Sept. 6, 1979, and assigned to the same assignee as named herein.

BACKGROUND OF THE INVENTION

1. Field of Use

The present invention relates to timers and more particularly to real time clock apparatus utilized by a data processing system.

2. Prior Art

It is well known that many computer applications require precision time generation apparatus such as a real time clock or an accurate time delay for the supervision of assigned programming tasks and the like. In general, in those instances in which accurate periods are required, an external circuit is used to time the necessary periods.

The clock when started continues to time a period until it is completed and the time is up. This results in an interrupt to the central processing unit which references a software clock manager routine for updating a real time clock counter word stored in the processing unit's main memory.

The several types of real time clocks include a programmable real time clock wherein the actual required period is preprogrammed within the clock by hardware or software, a free running real time clock which runs continuously with the clock signalling the central processing unit at the end of each period and a time of day clock which provides the central processing unit with the actual time. One type of real time clock is disclosed in U.S. Pat. No. 4,099,255 which issued to Philip E. Stanley, et al, and is assigned to the same assignee as named herein.

For the most part, real time clocks of the type mentioned usually require operator intervention in setting up the time of day and increase system overhead in requiring the central processing unit to update counter values in main memory which can be readily converted to a time of day indication. When it is desired to provide periodic interrupts on a time of day basis, this normally results in a further increase in system overhead.

Accordingly, it is an object of the present invention to provide timer apparatus which will minimize the system overhead required to be expended to provide a time of day interrupt capability.

It is a further object of the present invention to provide timer apparatus which would provide variable system interrupts without further increases in system overhead.

SUMMARY OF THE INVENTION

These objects are achieved in a preferred embodiment of the present invention which includes an adapter unit which couples to one of the controllers which couples to a central processing unit of a data processing system. The adapter unit includes a microprocessing unit (MPU), timer circuits, and time of day clock circuits. The time of day clock circuits of the preferred embodiment include a 48-bit independently operated free running counter and a 48-bit latch register for storing a time of day value in milliseconds read out of the 48-bit counter. The timer circuits include a number of programmable counter circuits capable of operating in a number of different modes. The adapter further includes a random access memory RAM unit and a programmable read only memory PROM unit, each of which connect to the microprocessing unit. In the preferred embodiment, the RAM includes a first number of locations for storing time of day values and an interval value and a second number of locations for storing control information used in controlling the operations of the timer circuits. The PROM includes the tables and ROM routines used in processing the tasks generated in response to the central processing unit's instructions.

In response to commands generated by the central processing unit, the microprocessing unit loads a future time of day or interval value received from the central processing unit into RAM. Thereafter, the microprocessing unit loads the timer circuits with a millisecond value and control information for establishing the time interval at which the present time of day is to be examined. Upon the generation of each such interrupt, the microprocessing unit loads the time of day millisecond count into RAM for the 48-bit latch comparison with a further time of day value stored in RAM. When a comparison is detected, the microprocessing unit generates an interrupt to the controller which signals the CPU of the time out. When the task command specifies that the interrupt be generated at intervals, the microprocessing unit generates a new future time of day value and signals which enable the operation to be repeated.

In accordance with the teachings of the present invention, for increased accuracy, the central processing unit generates a command which conditions the microprocessing unit to utilize a time interval provided by the central processing unit in lieu of generating the time interval from a further time of day value indicating the time of interrupt. In this manner, successive interrupts by the microprocessing unit based on this time interval are accurately generated. This is nothwithstanding that both central processing unit and adapter utilize independently operated clock circuits.

Additionally, the arrangement of the present invention utilizes the invention in copending patent application "A Real Time Adapter Unit for Use in a Data Processing System", invented by Boyd E. Darden and Henry F. Hartley, Ser. No. 73,058, filed on Sept. 6, 1979, which is assigned to the same assignee as named herein. This permits the microprocessing unit to obtain reliable and accurate time of day values from the time of day circuits.

The preferred embodiment of the adapter of the present invention is constructed from standard integrated circuit chips (e.g. MC6800, MC6821 and MC6840). This reduces cost and circuit complexity. It will be noted that since the microprocessing unit utilizes only one of the three counters included within the timer module chip, the remaining counters can be used by the microprocessing unit to perform internal and external timing operations. Upon the completion of each such operation, the microprocessing unit causes the generation of a system interrupt to the central processing unit.

Further, the adapter relieves the central processing unit of the burden of having to monitor and update values. Moreover, in accordance with the present invention, the central processing unit is able to request interrupts on the basis of any period of time (e.g. hours, days, weeks or years) thereby providing greater flexibility in carrying out its tasks without having to be concerned with any increase in processing time.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIG. 2 is a block diagram of the real time adapter apparatus of FIG. 1.

FIGS. 3a through 3c show in greater detail different portions of the real time adapter of FIG. 2.

DESCRIPTION OF THE PREFERRED EMBODIMENT

Figures 1, 5:
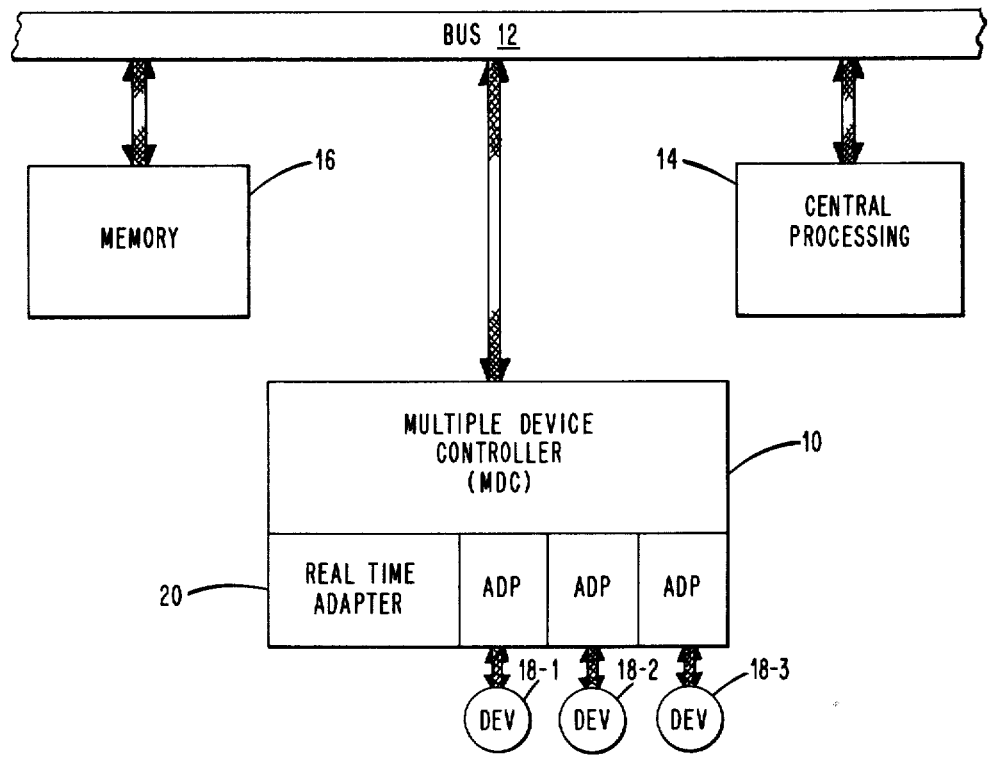
FIG. 1 is a block diagram of a data processing system which incorporates the real time adapter apparatus of the present invention.
FIG. 5 shows the memory organization of the different memory units of FIG. 2.

FIG. 1 is a block diagram of the system in which the real time adapter of the present invention is to be utilized. As seen from the figure, the system includes a central processing unit 14, a memory unit 16 and a multiple device controller 10 each of which couple to a bus 12. The controller 14 may for example service up to four devices through different ones of the adapter units 20. One of the adapters correspond to the real time adapter of the present invention while the others connect to different ones of the devices 18-1 through 18-3 as shown. The controller 10 may take the form of the microprogrammable controller disclosed in U.S. Pat. No. 4,025,906 issued May 24, 1977 and which is assigned to the same assignee as named herein.

GENERAL DESCRIPTION OF PREFERRED EMBODIMENT OF ADAPTER 20

FIG. 2 discloses in block diagram form the real time adapter 20 of the present invention. Referring to the figure, it is seen that the major sections of the adapter 200 include an interface and register section 21, MPU section 22, a data control section 23, a time of day counter 24, a clock circuit section 25 and a timer section 28. The interface and register section 21 under control of the microprocessor section 24 transfers time of day data and status information, and interrupt signals to the MDC 10. It also receives and stores data and control information transferred from MDC 10.

Register Section 21

As shown, section 21 includes the control logic circuits of block 210, a register file 212 and an eight bit data-in register 214 conected to the lines of interface 15 and the internal address and data busses of section 22 as shown. The units of section 21 also receive control and enabling signals from sections 23 and 24. The interface circuits 210 provide control signals (i.e., DATSRQIP-DATA) as inputs to sections 23 and 24.

The register file 212 is constructed from a pair of 4 by 4 register files with tristate outputs. Each file is organized as 4 words or 4 bits and includes separate read/write addressing for simultaneous reading and writing. The files are constructed from SN74LS670 register file chips manufactured by Texas Instruments Inc. and are described in the publication "*The TTL Data Book for Design Engineers*", Copyright 1976 by Texas Instruments. The data-in register 214 is constructed from a pair of 4 bit register circuits with tristate outputs such as SN74LS295 manufactured by Texas Instruments Inc.

Section 22

The microprocessor section 22 includes a microprocessor (MPU) 224 and associated random access memory (RAM) 226 and programmable read only memory (PROM) 228. The units 224, 226 and 228 connect to the internal data and address busses of section 22 as shown. The MPU 224 corresponds to the MC6800 microprocessor unit manufactured by Motorola Inc. which is described in the publication "*Basic Microprocessors and the 6800*", by Ron Bishop, Copyright 1979 by Hayden Book Company Inc. and in U.S. Pat. No. 3,962,682. The various descriptions of this microprocessor unit and other units are incorporated by reference to the extent necessary for an understanding of the present invention. Briefly, the MPU 224 is an 8-bit processor which executes instructions within a minimum execution time of 2 microseconds. The processor addresses the units which connect to it via certain ones of the lines A0-A15 of the 16-bit address bus and transfers data over the lines D0-D7 of an 8-bit bidirectional data bus at a one megahertz clock rate established by the clock signals from the circuits of section 25. The MPU 224 includes two, 8-bit accumulators (A, B), a 16-bit index register (IR), a 16-bit stack pointer register (SP), a 16-bit program counter (PA), and an 8-bit condition code register (CC). The two, 8-bit accumulators are used to store the operands and the results generated by an arithmetic and logic unit (ALU) included therein.

The index register stores memory address for an index mode of memory addressing while the stack pointer register stores the next address of a next available location in an external push-down-pop-up stack included within a section of RAM 226 as shown in FIG. 5. The program counter stores the program address and condition code register stores 6 bits of condition codes indicating the result of an ALU operation. These bits are tested by MPU 224 to detect the presence of certain conditions via conditional branch instructions.

As seen from FIG. 2, the control lines of MPU 224 include: a reset (RES) line which automatically resets the processor enabling it to begin an initialize routine for start-up, a data bus enable (DBE) line for enabling the data bus driver circuits, phase one ($\phi 1$) and phase two ($\phi 2$) clock lines which are connected to receive clocking signals from section 25, a valid memory address (VMA) line for indicating when a valid address has been applied to the address bus, and an interrupt request line ($\overline{IRQ}$) which signals the presence of an interrupt request.

The RAM 226 and PROM 228 which comprise the memory system of MPU 224 are shown in FIG. 5. The RAM 226 includes 1024 (1K) 8-bit locations and is coustructed from a pair of 1024×4-bit RAM memory chips with tristte outputs such as those designated as the 2114 manufactured by Intel Corporation. The RAM is divided into the four register sections shown in FIG. 5.

The PROM 228 also includes 2048 locations and is constructed from a pair of 2048×4 bipolar PROM tristate controlled chips designated as 82S185 manufactured by Signetics Corporation and described in the publication "Signetics Bipolar & MOS Memory Data Manual", printed January, 1979. The PROM is divided into the four sections shown in FIG. 5. Each section stores the different ROM routines required for adapter operation as explained herein.

As seen from FIG. 2, the RAM 226 is enabled for writing operation when section 23 forces a chip select (CS) and write enable (WE) terminals to binary ZEROS. An 8-bit address is applied via lines A15-A8 to the first 8 address input terminals of the RAM for read out or write in of an 8-bit word applied to the chips I/O lines 1-8. An 11-bit address is applied via the lines A15-A5 to the address input terminals of the PROM while signal CPROM 100 is applied to an enabling line CE for read out of an 8-bit instruction word on lines 01-08 from the specified location. An explained herein, signal CPROM100 is generated in accordance with the state of the address signal applied to the A4 line of the address bus.

Data Control Section 23

The data control section 23 includes the selector circuits of block 230 and a peripheral interface adapter (PIA) circuit 235. The selector circuits 230 receive address input signals from the address bus of section 22 and a memory clock signal TTL00210 from section 25. The circuits 230 are operative to generate a number of control enabling signals which are distributed to the different sections as shown. The PIA circuit 235 connects to MPU 224 via the data bus through lines D0-D7 and includes two separate sets of 8-bit bidirectional interface lines. Certain ones of interface lines PB0-PB3 apply signals COUNTA10-D10 to section 24 while the remaining lines PB4-PB7 are connected to receive signals DATSRQ10 through IPDATA10 generated by the interface circuits of block 210. The interface lines PA0-PA7 are connected to apply signals APIA0010-0710 to section 24.

The PIA circuit 235 is a MC6821 PIA circuit manufactured by Motorola Inc. and is described in detail in the above-referenced publication as well as in U.S. Pat. No. 4,145,751 issued Mar. 20, 1979. Each set of interface lines of the PIA circuit 235 includes a peripheral data register, a data direction register and a control register. The peripheral data register serves as an interface register while the data direction register is used to control the direction of data transfer.

As seen from FIG. 2, the circuit 235 also includes the following control lines: chip select lines CS0, CS1 and line $\overline{CS2}$ which receive address signals BIAD1310, BIAD1210 from MPU 223 and an enabling signal EN682100 from the circuits of block 230, an enable line which is connected to receive a timing signal TTL00210 from section 25, a read/write line (R/W) which is connected to receive a signal BIRW00 from the circuits of block 230 used for specifying the direction of transfers on the data bus, a pair of interrupt request lines, IRQA and IRQB, for applying interrupt requests to MPU 224, a pair of interrupt input lines, CA1 and CB1, which are used to set interrupt indications within the PIA control registers, a pair of peripheral control lines, CA2, CB2, each line being used as either an external interrupt input line or peripheral output line as a function of the contents of the control register associated therewith and a pair of register select lines, RS0, RS1, which are connected to receive address signals BIAD1510 and BIAD1410 from the address bus. These lines in conjunction with the control registers select the particular register within PIA 235 that is to be written into or read out. The PIA circuit 235 is enabled for operation when MPU 224 forces lines CS0 and CS1 to binary ONES and line $\overline{CS2}$ to a binary ZERO.

Time Of Day Counter Section 24

The time of day counter section 24 includes a 48-bit time of day counter 248 which couples a one kilohertz crystal controlled clock circuit of block 249, a 48-bit latch register 246, a plurality of inverter-driver circuits of blocks 242, 244 and 246 and the data selector circuits of block 241 connected as shown. The time of day counter 248 includes 12, 4 bit counter chip circuits connected in series to form a 48-bit counter. As discussed herein, the counters are constructed from the 4 bit binary counters designated as MC 14526B, manufactured by Motorola Inc. The 48-bit latch register 246 includes eight 8 bit shift registers which connect in parallel as explained herein. The shift registers are constructed from 9-bit static shift registers designated as MC 14021B manufactured by Motorola Inc.

The one megahertz clock circuits of block 249 include a 16 kilohertz crystal controlled oscillator 2492 which generates a 16 KHZ square wave timing signal, a series coupled divide by 16 count down counter circuit 249-1 which divides the 16 KHZ signal to a 1 KHZ timing signal and a series connected NAND gate 249-0 which applies an inverted 1 KHZ square wave signal to the input of counter 248. The 1 KHZ square wave signal decrements the time of day counter 248 at a one millisecond rate when an inhibit clock signal CNTINH10 applied to an inhibit input terminal is at a binary ZERO. The input terminal is connected to ground via a 1.2 kilohm resistor as shown thereby enabling the counter 248.

As seen from FIG. 2, the counter 248 receives data input signals from PIA235 via the inverter/driver circuits 242. The inverter/driver circuits 244 are connected to apply a plurality of loading signals LDCNTU-Z to counter 48 which are generated by the data selector circuits of block 241. The output signals TIME00-07 through TIME50-57 from counter 48 are applied as inputs to 48-bit latch register 246 which is connected to receive a latch control command signal LATCH10 from the circuits 241 and an enabling control signal WDENBL00 from selector circuits 230. The output signals DBIT00-07 from different stages of the shift registers of latch register 246 are, in turn, applied to the data bus via the inverter-driver circuits of block 247 when the circuits are enabled by signal WDENBL00. Each of the inverter-driver circuits of blocks 242, 244 and 247 are constructed from inverted data output driver circuits with tristate outputs designated as SN74368 manufactured by Texas Instruments Inc.

Section 25

The section 25 includes the clock circuits which are constructed from the MC6875 clock chip manufactured by Motorola Inc. The chip in response to the clocking signal CLKSIG10 applied to its input EXTIN, generates two phase nonoverlapping phase 1 and phase 2 clock signals on the $\phi 1$ and $\phi 2$ output lines in addition to a separate $\phi 2$TTL output signal which is applied at the MEMCLK output. The φ1 and φ2 clocking signals synchronize MPU operations in the following manner. During normal operation, when the phase 1 (φ1) clock signal is forced to a binary ONE, the contents of the MPU program counter are applied to the address bus. At this time, the VMA line switches to a ONE indicating a valid address. On the trailing edge of the φ1 clock signal, the program counter contents are incremented by ONE. When the φ2 clock signal is a binary ONE, the data from the addressed memory location is placed on the data bus and during the trailing edge of the φ2 signal, the data is latched into MPU 224. This sequence of operations occur within the MPU 224 each time the MPU addresses a memory location and transfers the data contents to a register within the MPU.

Timer Section 28

This section includes a programmable timer module 280 which includes three 16 bit binary counters, a corresponding number of control registers and a status register. These counters operate in response to commands received from MDC10 and may be used to generate interrupts and/or generate output signals. They can also be used to carry out frequency measurements, count events, interval measurements, wave form generation etc. The module 280 of the preferred embodiment is constructed from the MC6840 chip manufactured by Motorola Inc.

For the ease of explanation, the operation of the module 280 will be described to the extent necessary for an understanding of the present invention. Referring to FIG. 2, it is seen that the input register select terminals RS0, RS1 and RS2 connect to address bus lines BIAD15 through BIAD13 respectively. These lines are used in conjunction with the signal applied to the R/W terminal to select which one of the registers or counters is to be loaded from or read out to the bidirectional data line terminals D0–D7 which connect to the data bus lines LBDT00-07. Additionally, one chip select input terminal CS1 is connected to address bus line BIAD12 while the other chip select input terminal CS0 is connected to receive an enabling signal from the selector circuits of block 230. With CS0 a binary ZERO and CS1 a binary one, module 280 is selected or enabled for a data transfer operation. The selector circuits 230 also connect to a read/write control terminal R/W as shown.

With the timer module 280 selected, a binary ZERO applied to the R/W terminal enables the input buffers and data is transferred from MPU 224 to timer module 280 on the trailing edge of the clocking signal applied to the enable/C2 terminal. When the R/W terminal is forced to a binary ONE, data is transferred from the timer module 280 to MPU 224.

The enable/C2 input terminal receives phase two clocking signal PHI00210 from the clock circuits 25. This signal synchronizes data transfers between MPU 224 and the timer module 280.

Lastly, the interrupt request terminal IRQ is connected in common with the IRQ terminals of PIA circuit 235. The IRQ terminal is activated (forced to a binary ZERO) only when bit 7 of the status register is set to a binary ONE. That is, the status register includes an interrupt flag indicator bits. Bits 0, 1, and 2 are assigned to timers 1, 2 and 3 respectively. Bit 7 is a composite interrupt indicator which is set when any of the individual interrupt indicator bits is set and bit 6 of the corresponding control register is a binary ONE.

For further details regarding the timer module, reference may be made to the publication "MC6840 Programmable Timer" published by Motorola Inc. copyright 1977.

DETAILED DESCRIPTION OF PREFERRED EMBODIMENT OF ADAPTER 20

Figure 3A:
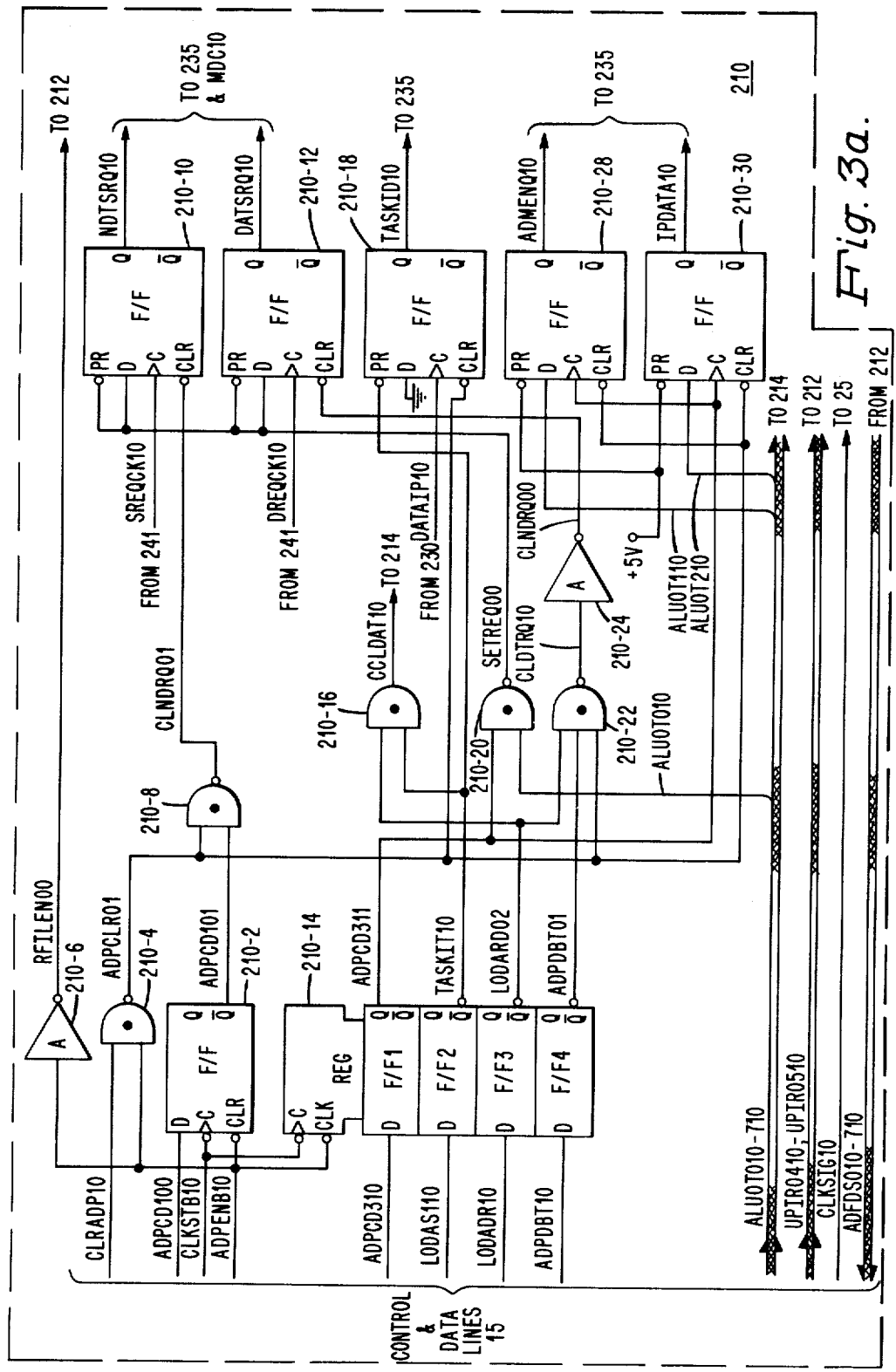

The different sections of FIG. 2 will now be described in greater detail with reference to FIGS. 3a–3c and 4. Referring first to FIG. 3a, it is seen that the signals from different ones of the control and data lines 15 are applied as inputs to the MDC adapter interface circuits of block 210. Also, other ones of the signals from the lines 15 are distributed to other sections of FIG. 2.

Figure 4:
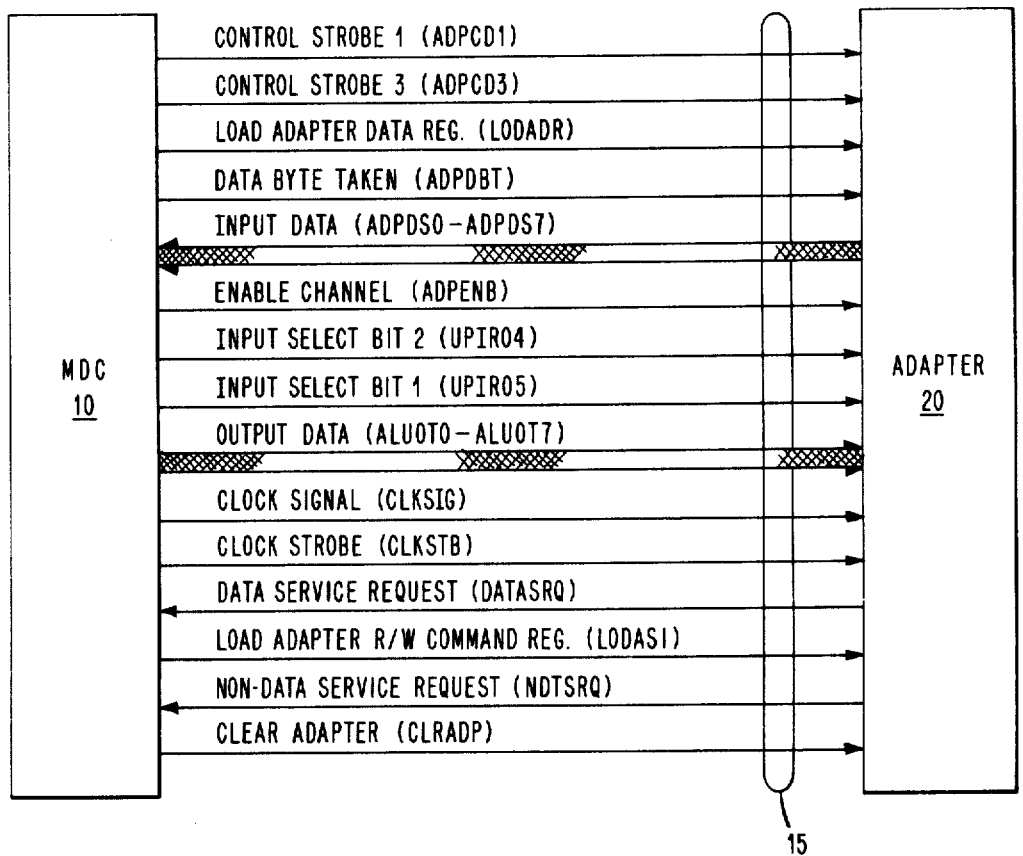
FIG. 4 shows in detail the interface between controller 10 and adapter 20 of FIG. 1.

As shown in FIG. 4, the interface lines include a control strobe 1 line (ADPCD1), a control strobe 3 line (ADPCD3), a load adapter data register line (LOADADR), a data byte taken line (ADPDBT), a plurality of input data byte lines (ADPDS0-S7), an enable channel line (ADPENB), a pair of input select lines (UPIR04, UPIR05), a plurality of output data byte lines (ALUOT0-T7), an MDC clock signal line (CLKSIG), an MDC clock strobe line (CLKSTB), a data service request line (DATSRQ), a load adapter read/write command register line (LODAS1), a nondata service request line (NDTSRQ), and a clear adapter line (CLRADP).

The description of the interface lines is given in greater detail in the section to follow.

| DESIGNATION | DESCRIPTION |
| --- | --- |
| ADPCD1 | The control strobe 1 line is a unidirectional line which extends from MDC10 to adapter 20. When set to a binary ONE, it resets to a binary ZERO, a non-data service request indicator flip-flop (NDTSRQ). |
| ADPCD3 | The control strobe 3 line is a unidirectional line which extends from MDC10 to adapter 20. When set to a binary ONE, this line in accordance with the states of lines ALUOT0-2 sets different indicator flip-flops as follows:<br>(1) With ALUOT0 set to a binary ONE, line ADPCD3 sets the NDTSRQ flip-flop and a DATSRQ flip-flop;<br>(2) With ALUOT1 set to a binary ONE, line ADPCD3 sets an ADMENQ flip-flop; and<br>(3) With ALUOT2 set to a binary ONE, line ADPCD3 sets an IPDATA flip-flop. |
| LODADR | The load adapter data register is a unidirectional line which extends from MDC10 to adapter 20. When set to a binary ONE, it causes an output data byte from MDC10 to be loaded into the data-in register 214. It also resets DATSRQ flip-flop to a binary ONE. |
| ADPDBT | The data byte taken line is a unidirectional line which extends from MDC10 to adapter 20. The MDC10 forces this line to a binary ONE to signal adapter 20 that it has taken the data byte applied to the lines ADPDS0-S7 or to signal when it has applied a data byte to lines ALUOT0-07. |
| ADPS0-7 | The input data byte lines are unidirectional lines which extend from the adapter 20 to MDC10. These |

-continued

| DESIGNATION | DESCRIPTION |
|---|---|
| | lines apply status, data or control bytes read out from register file 212 to MDC10. |
| ADPENB | The enable channel line is a unidirectional line which extends from MDC10 to adapter 20. When set to a binary ONE, the line enables the adapter 20 to receive commands from MDC10 and transfer status information to MDC10. |
| UPIR04, UPIR05 | The input select bit 2 and input select bit 1 lines are unidirectional lines which extend from the MDC10 to adapter 20. These lines apply read select signals for read out of information from register file 212. |
| ALUOT0-7 | The data output byte lines are unidirectional lines which extend from MDC10 to adapter 20. These lines apply data and control bytes from MDC10 to adapter 20. |
| CLKSIG | The clock signal line is a unidirectional line which extends from the MDC10 to adapter 20. This line applies a 125 nanosecond width clock pulse having a frequency of 4 megahertz from MDC10 to adapter 20. |
| CLKSTB | The clock strobe line is a unidirectional line which extends from MDC10 to adapter 20. This line applies a 35-55 nanosecond width clock pulse having a frequency of 4 megahertz from MDC10 to adapter 20. |
| DATSRQ | The data service request line is a unidirectional line which extends from adapter 20 to MDC10. This line is forced to a binary ONE by adapter 20 to signal MDC10 for the transfer of an input or output data byte. |
| LODAS1 | The load adapter read/write command register line is a unidirectional line which extends from MDC10 to adapter 20. When set to a binary ONE, this line enables the most significant byte of a task word to be loaded into the data-in register 214. |
| NDTSRQ | The non-data service request line is a unidirectional line which extends from adapter 20 to MDC10. When set to a binary ONE, this line signals MDC10 of a service request to change the operational state of adapter 20. |
| CLRADP | The clear adapter line is a unidirectional line which extends from MDC10 to adapter 20. This line is used to clear the major sections of adapter 20. |

Now the different sections of adapter 20 will be discussed in greater detail with reference to FIGS. 3a-3c.

MDC INTERFACE CIRCUITS 210

Referring to FIG. 3a, it is seen that the MDC adapter interface circuits of block 210 receive signals from different ones of the interface lines 15. Signals from other ones of the lines 15 (i.e., ALUT0-7, UPIR04, UPIR05 and CLKSIG) are forwarded to other portions of adapter 20 (i.e., 212, 214 and 25).

In greater detail, a control strobe 3 signal ADPCD310 from the ADPCD3 line is applied to an input terminal of a first D type flip-flop stage of a four state register 210-14. The remaining stages are connected to receive load adapter command register signal LODAS110, the load adapter data register signal LODADR10 and the data byte taken signal ADPDBT10 from lines LODAS1, LODADR and ADPDBT lines respectively. The signals applied to the register 210-14 are loaded into the stages on the positive going edge of clock strobe signal CLKSTB10 from line CLKSTB applied to the register clock terminal. This occurs when the channel enable signal ADPENB10 applied to line ADPENB is a binary ONE. Signal ADPENB10 enables adapter 20 to communicate with MDC10 by enabling register file 210-10 by causing an inverter circuit 210-6 to force signal RFILEN00 to a binary ZERO.

The output signal ADPCD3 from ONE side of the first flip-flop is applied to one input of a NAND gate 210-20 and to the clock input terminals of a pair of D type flip-flops 210-28 and 210-30. The data bit zero signal ALUOT010 from line ALUOT0 is applied to the other input terminal of NAND gate 210-20. The output signal SETREQ00 from NAND gate 210-20 is applied to the PR and D input terminals of two other D type flip-flops 210-10 and 210-12. These correspond to the NDTSRQ and DATSRQ flip-flops whose binary ONE outputs are applied to the NDTSRQ and DATSRQ lines as well as to P terminals PB5 and PB6 respectively of PIA 235.

When signals ADPCD311 and ALUOT010 are forced to binary ONES by the MDC10, NAND gate 210-20 forces signal SETREQ00 to a binary ZERO. This, in turn, switches the NDTSRQ and DATSRQ flip-flops 210-10 and 210-12 to binary ONES. The flip-flops 210-10 and 210-12 can also be set to binary ONES by signals SREQCK10 and DREQCK10 from the circuits 241 under the control of the signals COUNTA10-COUNTD10 generated by PIA235.

As mentioned, the NDTSREQ10 signal when a binary ONE indicates an operational state change in adapter 20 while the signal DATSRQ10 when a binary ONE indicates a data transfer request.

The above action occurs in response to a status request from unit 14. That is, the central processing unit 14 through software can request a status report from adapter 20 by applying a function code having a value of 18 to the MDC10. The MDC10, under microprogram control, forces signals ADPCD310, and ALUOT10 to binary ONES which, in turn, force signals DATSRQ10 and NDTSRQ10 to binary ONES and then resets DATSRQ flip-flop to a binary ZERO for a status request. The MDC10 in response to these signals is operative to set the register file 214 read select lines UPIR04 and UPIR05 to a binary ONE and a binary ZERO respectively for read out of the register file status word information applied on lines ADFDS0-7 via the interface circuits 210. The status byte received by MDC10 indicates the state of adapter 20 at the last interrupt and whether the adapter is in a ready state (i.e., available for a data byte transfer) or indicates various error/interrupt conditions.

As seen from FIG. 3a, the ADPCD100 signal from the ADPCD1 control strobe line is applied to the D input terminal of D type flip-flop 210-2. This signal, when a binary ONE, sets the flip-flop 210-2 to a binary ONE on the positive going edge of clock strobe pulse CLKSTB10 from MDC10 when signal ADPENB10 is a binary ONE. The binary ZERO output signal ADPCD101 from flip-flop 210-2 is applied as one input o an AND gate 210-8. This causes AND gate 210-8 to force output signal CLNDRQ00 to a binary ZERO which resets NDTSRQ flip-flop 210-10 to a binary ZERO via its CLR input terminal.

As seen from FIG. 3a, the data bit one signal ALUOT110 from line ALUOT1 is applied to the D input terminal of the flip-flop 210-28. When signal ALUOT110 is a binary ONE, it causes flip-flop 210-28 to switch to a binary ONE on the positive going edge of signal ADPCD311. The binary ONE output signal ADMENQ10 from flip-flop 210-28 is applied to PB6 terminal of PIA235. This permits PIA235 to sample the state of DATSRQ flip-flop 210-12.

The data bit two signal ALUOT210 from line ALUOT2 is applied to the D input terminal of flip-flop 210-30. When signal ALUOT210 is a binary ONE, it causes flip-flop 210-30 to switch to a binary ONE on the positive going edge of signal ADPCD311. The binary ONE output signal IPDATA10 is applied to the PB7 terminal of PIA235. This line is used to monitor the state of the IPDATA flip-flop.

The output signal LODARD02 from the binary ZERO side of the third stage of register 210-14 is applied to one input of an AND GATE 210-16. When signal LOARD02 is forced to a binary ZERO, AND gate 210-16 forces signal CCLDAT10 to a binary ZERO. The negative going edge of this signal applied to the CK input terminal of data-in register 214 of FIG. 2 loads the data byte applied to lines AULUOT0-7 into the register.

Also, as seen from FIG. 3a, signal LODARD02 resets DATSRQ flip-flop 210-12 via a NAND gate 210-22 and inverter circuit 210-24. That is, when signal LODARD02 switches to a binary ZERO, it causes NAND gate 210-22 to force signal CLDTRQ10 to a binary ONE. This, in turn, causes inverter circuit 210-24 to force signal CLNDRQ00 to a binary ZERO which clears DATSRQ flip-flop 210-12 to a ZERO. The above switching of the LODADR line takes place in response to the adapter switching of the DATSRQ flip-flop 210-12 which remains set until the data byte has been loaded into data in register 214.

The binary ZERO side of the second stage of register 210-14 switches to a binary ZERO when signal LODAS110 from line LODAS1 is a binary ONE. The signal TASKIT10 is applied as a second input to AND gate 210-16 and causes it to force signal CCLDAT10 to a binary ZERO. This, in turn, enables a task word byte to be loaded into the data-in register 214 of FIG. 2. Also, signal TASKIT10 causes a flip-flop 210-18 to switch to a binary ONE in response to signal DATAIP10. The binary ONE output signal TASKID10 applied to the CA1 input terminal of PIA235 of FIG. 2 signals an interrupt. This sets the interrupt indicator (bit 7) in control register A which, in turn, forces the IN-TREQ00 signal to a binary ZERO which interprets MPU224. This action is carried out in response to each task generated by software and forwarded via the MDC10 to adapter 20. The MPU224 branches to an interrupt handler routine stored in PROM 228 which, in turn, interrogates the PIA control registers and the branches to a task table routine which decodes the task command. This is followed by a branch to the appropriate ROM routine for executing the specified task as explained herein.

The fourth stage of register 210-14 is switched to a binary ONE by MDC10 when the MDC10 has taken the data byte applied to the ADFDS0-7 lines. The binary ZERO signal ADPDBT01 when forced to a binary ZERO causes the DATSRQ flip-flop 210-12 to be reset to a binary ZERO. Resetting takes place via the NAND gate 210-22 and inverter circuit 210-24.

The signal CLRADP10 applied to the line CLRADP when set to a binary ONE resets the NDTSRQ flip-flop 210-10, the DATASRQ flip-flop 210-12, the TASKID flip-flop 210-18, the ADMENQ flip-flop 210-28 and IPDATA flip-flop 210-30 to binary ZEROS when the adapter 20 is enabled (i.e., signal ADPENB10 is a binary ONE). The signals ADPENB10 and CLRADP10 causes NAND gate 210-4 to switch signal ADPCLR01 to a binary ZERO. This, in turn, forces signals CLNDRQ01 and CLNDRQ00 to binary ZEROS which together with signal ADPCLR01 clear the flip-flops to ZEROS.

Each of the flip-flops may take the form of circuits disclosed in the above referenced Texas Instrument Inc. publication. For example, the flip-flops 210-10, 210-12, 210-18, 210-28 and 210-30 may be constructed from SN74LS74 chips while the flip-flop 210-1 and register 210-14 may be constructed from SN74S175 chips.

SELECTOR CIRCUITS 230

Figure 3B:
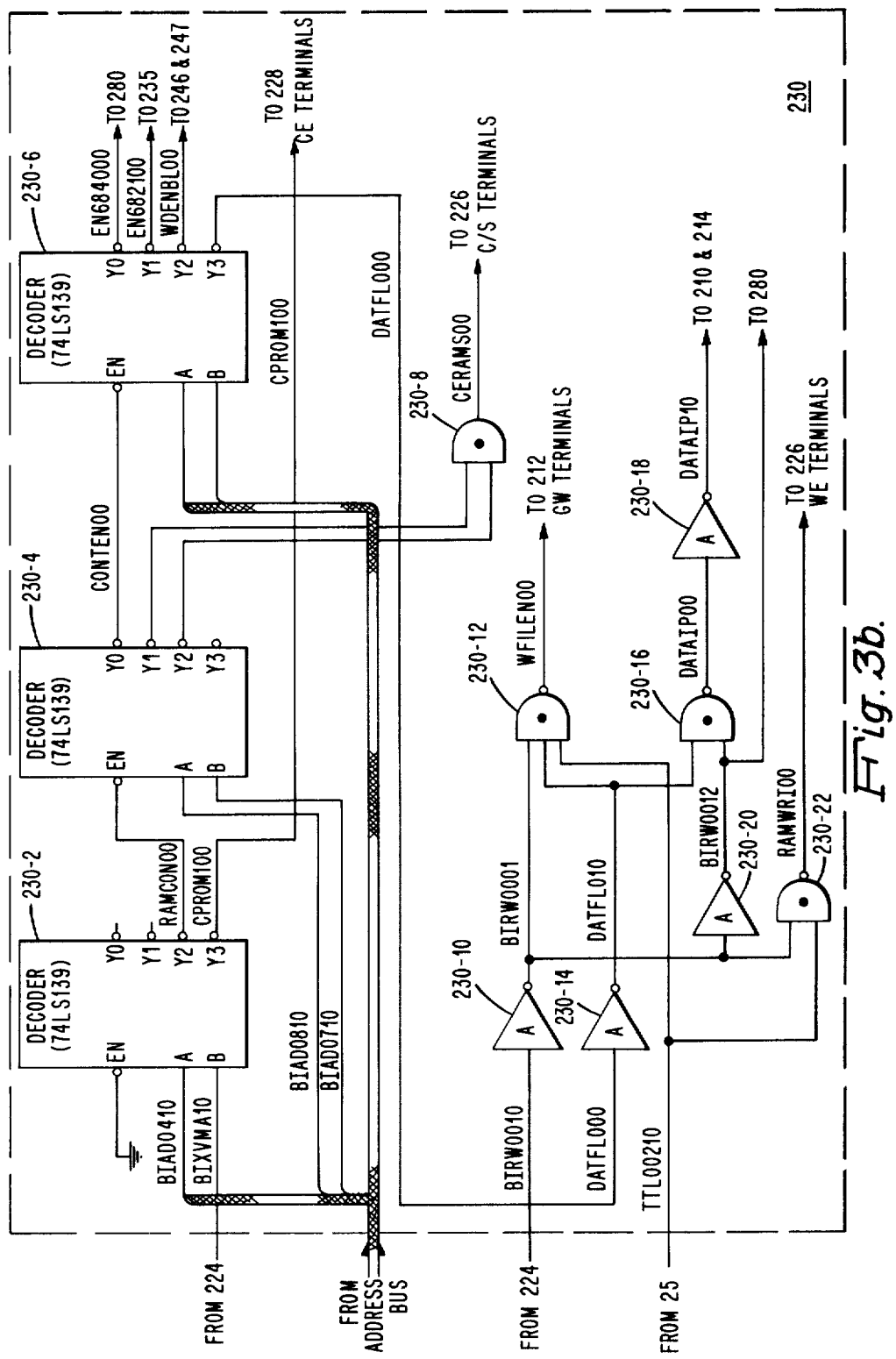

FIG. 3b shows in greater detail, the selector circuits 230 of FIG. 2. Referring to that Figure, it is seen that circuits 230 include a plurality of decoder circuits 230-2, 230-4 and 230-6, a number of inverter circuits 230-10, 230-14, 230-18 and 230-20 and a number of NAND-/AND gates 230-12, 230-16, 230-22 and 230-8. The selector circuits 230 receive MPU address signals BIAD0410, BIAD0710, BIAD0810, BIAD0910 and BIAD1010 from the address bus in addition to valid address signal BIXVMA10 from MPU 224. Pairs of these signals are applied to the input select terminals A and B of each of the decoder circuits 230-2 through 230-6, as shown.

When signals BIAD0410 and BIXVMA10 are forced to binary ONES, decoder circuit 230-2 forces signal CPROM100 at its Y3 terminal to a binary ZERO. This signal selects or enables PROM 228. When signal BIAD0410 is a binary ZERO and signal BIXVMA10 is at a binary ONE, decoder circuit 230-2 forces signal RAMCON00 to a binary ZERO. This, in turn, enables decoder circuit 230-4.

Signals BIAD0810 and BIAD0710 are applied to the A and B select input terminals of decoder circuit 230-4. They cause AND gate 230-8 to force signal CE-RAMS00 to a binary ZERO when either signal is a binary ONE. When signal CERAMS00 is a binary ZERO. RAM 226 is enabled to perform a read or write cycle of operation. When signals BIAD0810 and BIAD0710 are both binary ZEROS, decoder circuit 230-4 forces output signal CONTEN00 to a binary ZERO. This, in turn, enables decoder circuit 230-6.

The signals BIAD1010 and BIAD0910 are applied to the A and B select input terminals of decoder circuit 230-6. When signal BIAD1010 is a binary ONE and signal BIAD0910 is a binary ZERO, decoder circuit 230-6 forces output signal EN682100 to a binary ZERO. This signal, as mentioned, is applied to the CS2 terminal of PIA235. When signal EN682100 is a binary ZERO and the signals BIAD1310 and BIAD1210 applied to the CS0 and CS1 terminals of PIA235 are forced to binary ONES by MPU224, this addresses PIA235 of FIG. 2. When signals BIAD1010 and BIAD0910 are binary ZEROS, decoder circuit 230-6 forces signal EN684000 to a binary ZERO. This signal is applied to the CS0 terminal of programmable timer module 280 as mentioned. When signal EN684000 is a binary ZERO and the signal applied to terminal CS1 is a binary ONE, timer module 280 is enabled.

When signal BIAD1010 is a binary ZERO and signal BIAD0910 is a binary ONE, decoder circuit 230-6 forces signal WDENBL00 to a binary ZERO. As mentioned, this signal is applied to the clock input terminal of latch register 246 of FIG. 2 for loading the output signals from counter 248 into register 246 or shift the contents of register 246 on the negative going edge of signal WDENBL00 when signal LATCHT10 is a binary ONE. Signal WDENBL00, applied to the enable terminals of the driver/inverter circuits 247 when a binary ZERO, applies the signals on lines DBIT00-07 to the data bus lines LBDT00-7.

When signals BIAD1010 and BIAD0910 are both binary ONES, decoder circuit 230-6 forces signal DATFL000 to a binary ZERO. Signal DATFL000 is inverted by inverter circuit 230-14 and applied as one input to NAND gate 230-12. When MPU224 is in a write state (i.e., set from a write operation), it forces signal BIRW0010 to a binary ZERO. This signal is inverted by inverter circuit 230-10 and applied as another input to NAND gate 230-12. When signals BIRW0001 and DATFL010 are both binary ONES, NAND gate 230-12 generates signal WFILEN00 in response to clock signal TTL00210 from section 25. When signal WFILEN00 is a binary ZERO, it enables register file 212 for a write cycle of operation.

Additionally, clock signal TTL00210 and signal BIRW0001 are applied to NAND gate 230-22. When binary ONES, these signals cause NAND gate 230-22 to force signal RAWWRI00 to a binary ZERO, This, in turn, enables RAM226 for a write cycle of operation.

When MPU224 is in a read state, signal BIRW0010 is a binary ONE. This causes signal BIRW0012 from inverter circuit 230-20 to be a binary ONE. This signal is applied to the R/W control terminal of timer module 280 which enables the module for a read operation.

With signal DATFL010 a binary ONE, this causes NAND gate 230-16 to force signal DATAIP00 to a binary ZERO. When inverted by inverter circuit 230-18, signal BATAIP10 is forced to a binary ONE. This signal enables the data-in register 214 to apply output signals to the lines LBDT00-07 of the data bus as seen from FIG. 2. Also, the signal DATAIP10 applied to the clock terminal of the TASKID flip-flop of FIG. 3a is used to reset the flip-flop to a binary ZERO state.

TIME OF DAY COUNTER SECTION 24

FIG. 3c shows in greater detail, the time of day counter section 24. Referring to the FIG. 3c, it is seen that a number of the 8 static shift register circuits 246-1 through 246-8 which comprise the 48-bit latch register 246 are shown. Different sets of timing output signals from the time of day counter 248 are applied to each of the static shift registers. For example, signals TIME0000 through TIME5000 corresponding to a first bit (most significant bit) of each of the 6 bytes are applied to register 246-1 while signals TIME0700 through 5700 corresponding to the last bit (least significant bit) of each of the 6 bytes are applied to register 246-8. The remaining bits of the bytes are applied to the other registers, not shown. The output of the most significant stage of each of the registers 246-1 through 246-8 are applied to the lines DBIT00-7. As discussed herein, this arrangement enables the successive read out of bytes using a single address which results in the generation of clock signal WDENBL00.

Signal LATCH10 generated by the selector circuits 230 is applied to the P/S terminal of each of the registers 246-1 through 246-8. When at a binary ONE, signal LATCH10 loads signals TIME0000-5700 into registers 246-1 through 246-8 on the positive going edge of clock signal WDENBL00. At that time, the low order byte signals DBIT0100 through DBIT0700 are available on lines DBIT-0-07. Also, when signal LATCH10 is a binary ONE, this results in shifting the data byte bit contents of registers 246-1 through 246-8 one byte position for each positive going edge of clock signal WDENBL00 thereby enabling each byte to be successively applied to lines DBIT00-07, in response to a series of clock signals.

FIG. 3c shows several of the twelve counter circuits 248-1 through 248-12 which comprise time of day counter 248. Each of the counter circuits 248-1 through 248-12 connect to the ODAT00-07 lines for loading different ones of the sets of the byte signals into counter circuits 248-1 through 248-12 transferred from MDC10 by PIA235. For example, it is seen that counter circuits 248-1 and 248-2 connect in series and store the byte signals of the least significant byte of the time of day counter contents. The most significant byte of the time of day counter is stored by series connected counter circuits 248-11 and 248-12. The remaining counter circuits, not shown, store the other bytes. The clock pulse signal 1KHZCK10 which is applied to the clock input terminal of counter circuit 248-1 goes positive every millisecond. This signal causes a count of one to be added to the low order bit position of counter circuit 248-1 every millisecond effective in incrementing the time of day count by one as long as inhibit signal CNTINH10 is a binary ZERO.

It will be noted that signal LMCNTU10 is applied to the preset enable (PE) terminals of the counter circuits 248-1 and 248-2. Similarly, signals LMCNTV10, LMCNTW10, LMCNTX10, LMCNTZ10 are applied to the PE terminals of counter circuits 248-3 and 248-4, 248-5 and 248-6, 248-7 and 248-8 and 248-9 and 248-10, not shown. Lastly, signal LMCNTZ10 is applied to the PE terminals of counter circuits 248-11 and 248-12.

As explained herein, the load signals are generated by the data selector circuits 241 in response to the signals COUNTA10 through COUNTD10 from PIA235. When each of the signals LMCNTU10 through LMCNTZ10 is a binary ONE, it enables the corresponding one of the counter circuits to be loaded with the byte signals applied to the lines ODAT00-07. For example, signal LMCNTU10 enables the loading of the least significant byte while signal LMCNTZ10 enables the loading of the most significant byte. In this manner, counter circuits 248-1 through 248-12 store the number of milliseconds which elapsed since Jan. 1, 1901 and will overflow after 136 years.

Referring to FIG. 3c, it is seen that the data selector circuits 241 include a pair of binary to octal decoder circuits 241-2 and 241-6. This signals COUNTA10 through COUNTC10 are applied to the select input terminals A through C respectively of each of the decoder circuits 241-2 and 241-4. The signal COUNTD10 is applied to the G2A and G2B enable terminals of decoder circuit 241-2 and to the G1 enable terminal of decoder circuit 241-4.

The decoder circuit 241-2 is enabled for operation when signal COUNTD10 is a binary ZERO while decoder circuit 241-4 is enabled for operation when signal COUNTD10 is a binary ONE. Each of the decoder circuits 241-2 and 241-4 is conventional in design and may be constructed from chips such as the SN74LS138 manufactured by Texas Instruments Inc.

In operation, the decoder circuit 241-2 forces output signal SREQCK10 to a binary ZERO when signals COUNTA10 through COUNTC10 have the value "001". As mentioned, this signal is applied to the clock terminal of NDTSRQ flip-flop 210-10 of FIG. 3a which resets on the positive going edge of the SREQCK10 signal.

The decoder circuit 241-2 forces output signal DREQCK10 to a binary ZERO when signals COUNTA10 through COUNTC10 have the value "010". The signal DREQCK10 as mentioned previously is applied to the clock terminal of the DATSRQ flip-flop 210-12 of FIG. 3a which resets on the positive going edge of the DREQCK10 signal.

When the signals COUNTA10 through COUNTC10 have the value "011", decoder circuit 241-2 forces output signal LATCH10 to a binary ZERO. This signal after being inverted by inverter circuit 241-6 is applied to the P/S terminals of registers 246-1 through 246-8 for conditioning the registers for a parallel load or serial shift mode of operation. For the purposes of the present invention, the remaining output signals may be omitted.

When the decoder circuit 241-4 is enabled for operation, it forces corresponding ones of the signals LDCNTU00 through LDCNTZ00 to binary ONES in response to signals COUNTA10 through COUNTC10 having the values "001" through "110". The signals LDCNTU00 through LDCNTZ00 are applied to the inverter driver circuits 244 of FIG. 2 and result in the generation of signals LMCNTU100 through LMCNTZ100 respectively. As mentioned, these signals are used to load different ones of the counter circuits 248-1 through 248-6.

DESCRIPTION OF OPERATION

With reference to FIGS. 1 through 5, the ROM routines and memory tables set forth herein, the operation of the preferred embodiment of the present invention will now be described. First, the ROM routines and memory tables will be discussed briefly. The line numbers are used merely for reference. Lines 1000-6000 illustrate in greater detail the register storage within MPU 224. Lines 6100-6800 illustrate in greater detail, the register storage within timer module 280. Lines 7000-8500 illustrate in greater detail the register storage of PIA 235. Lines 8700-11800 illustrate the different premanently assigned locations within RAM 226 shown in FIG. 5 which are utilized by MPU 224. Lines 149400 through 197200 illustrate the ROM routines and table within PROM 228 of FIG. 5 pertinent to the present invention. The above mentioned tables and ROM routines referenced herein are as follows.

```
        MC6800

1000
          .
          .
2300    REG IX(16 BITS)          INDEX REGISTER
2400    REG PC(16 BITS)          PROGRAM COUNTER
2500    REG SP(16 BITS)          STACK POINTER
2600    REG A  (8 BITS )         ACCUMULATOR A
2700    REG B  (8 BITS )         ACCUMULATOR B
2800    REG CCR(6 BITS)          CONDITION CODE REG
2900    REG HADD(16 BITS)        HIGH ADDRESS
3100    SREGH = CCR(0)           HALF ADD INDICATOR
4600    VEC IRQ                  INTERRUPT REQUEST LINE
6000
6100    MC6840
6200    CONSTANT CNTR1CRA = 08#  CONTROL REG. 1
6300    CONSTANT CNTR3CRA = 08#  CONTROL REG. 3
6400    CONSTANT CNTR2CRA = 09#  CONTROL REG. 2
6500    CONSTANT CNTRSRA  = 09#  STATUS
6600    CONSTANT CNTR1    = 0A#  COUNTER 1
```

| | | | | |
|---|---|---|---|---|
| 6700 | CONSTANT CNTR2 | = 0C# | COUNTER 2 | |
| 6800 | CONSTANT CNTR3 | = 0E# | COUNTER 3 | |

MC6821 STORAGE

| | | | | |
|---|---|---|---|---|
| 7000 | CONSTANT PIADDRA | = 2C# | DATA DIRECTION REG. PORT A |
| 7100 | CONSTANT PIAORA | = 2C# | OUTPUT REG. PORT A |
| 7200 | CONSTANT PIACRA | = 2D# | CONTROL REG. PORT A |
| 7300 | CONSTANT PIAADDRB | = 2E# | DATA DIRECTION REG. PORT B |
| 7400 | CONSTANT PIAORB | = 2E# | OUTPUT REG. PORT B |
| 7500 | CONSTANT PIACRB | = 2F# | CONTROL REG. PORT B |
| 8100 | CONSTANT MDCRG | = 60# | DATA REG TO/FROM MDC |
| 8200 | CONSTANT IDRG | = 61# | ID STORAGE REG. |
| 8300 | CONSTANT STATRG | = 62# | STATUS REG. |
| 8400 | CONSTANT TSKRG | = 63# | TASK REGISTER |
| 8500 | CONSTANT WDENBL | = 40# | READ TIMER BUFFER |

DATA CONSTANTS USED WITH ADDRESS
CONSTANT        = 2E

| | | | | |
|---|---|---|---|---|
| 7700 | CONSTANT NDSRQ | = 01# | NON DATA SERVICE REQUEST |
| 7800 | CONSTANT DSRQ | = 02# | DATA SERVICE REQUEST CODE |
| 7900 | CONSTANT LATCH | = 03# | LATCH CNTR TO BUFFERS |
| 8000 | CONSTANT ICLKCNTR | = 05# | INC. CLOCK CNTR |
| 8700 | RAM STORAGE 226 | | |
| 8800 | CONSTANT MDCXCNTR | = 80# | TRANSFER CNTR |
| 8900 | CONSTANT XFRBUF1 | = 81# | TRANSFER BUFFER 1 |
| 9000 | CONSTANT XFRBUF2 | = 82# | TRANSFER BUFFER 2 |
| 9100 | CONSTANT XFRBUF3 | = 83# | TRANSFER BUFFER 3 |
| 9200 | CONSTANT XFRBUF4 | = 84# | TRANSFER BUFFER 4 |
| 9300 | CONSTANT XFRBUF5 | = 85# | TRANSFER BUFFER 5 |
| 9400 | CONSTANT XFRBUF6 | = 86# | TRANSFER BUFFER 6 |
| 9500 | CONSTANT CNTR1CRS | = 8A# | CNTR 1 CR STORAGE |
| 9600 | CONSTANT CNTRFREQ | = 8B# | SELECT COUNTER CLOCK |
| 9700 | CONSTANT CNTR2CRS | = 8C# | CNTR2 CR STORAGE |
| 9800 | CONSTANT CNTR3CRS | = 8E# | CNTR3 CR STORAGE |
| 9900 | CONSTANT PASSCNTR | = 90# | PASS CNTR |

| | | | | | |
|---|---|---|---|---|---|
| 10000 | FUTURE BUFFER 1 | = 91# | | | |
| | FUTURE BUFFER 6 | = 96# | | | |
| 10100 | CONSTANT CNTR1MSB | = 9A# | CNTR1 MSB | | |
| 10200 | CONSTANT CNTR1LSB | = 9B# | CNTR1 LSB | | |
| 10300 | CONSTANT CNTR2MSB | = 9C# | CNTR2 MSB | | |
| 10400 | CONSTANT CNTR2LSB | = 9D# | CNTR2 LSB | | |
| 10500 | CONSTANT CNTR3MSB | = 9E# | CNTR3 MSB | | |

RAM 226

| | | | | | |
|---|---|---|---|---|---|
| 10600 | CONSTANT CNTR3LSB | = 9F# | CNTR3 LSB | | |
| 10700 | CONSTANT CNTR2MDE | = A0# | CNTR2 MODE | | |
| 10800 | INTERVAL BUFFER | = A1# | | | |
| | INTERVAL BUFFER | = A6# | | | |
| 10900 | CONSTANT TMRDDRA | = AC# | STORAGE, DDRA | | |
| 11000 | CONSTANT TMRCRA | = AD# | STORAGE, CRA | | |
| 11100 | CONSTANT TMRDDRB | = AE# | STORAGE, DDRB | | |
| 11200 | CONSTANT TMRCRB | = AF# | STORAGE, CRB | | |
| 11300 | CONSTANT TSKTBLH | = B0# | TASK TABLE LOOK UP HO | | |
| 11400 | CONSTANT TSKTBLL | = B1# | LO | | |
| 11500 | CONSTANT TSKRAH | = B2# | TASK ROUTINE ADDRESS HO | | |
| 11600 | CONSTANT TSKRAL | = B3# | LO | | |
| 11800 | | | | | |

PROM 228

| | | | | ADDRESS (HEX) | IMAGE (HEX) |
|---|---|---|---|---|---|
| 149400 | DIALOGUE BETWEEN TIMER AND MDC ROM ROUTINE | | | | |
| 149500 | $TMRMDC10 | LDA (A,PIAORB) | READ B PORT | 8FF 900 | 96 2E |
| 149600 | $ | BITI(A,40#) | EXAMINE FOR ADAPTER ENABLE | 901 902 | 85 40 |
| 149700 | $ | BEQ ($MDCIOERR) | ERROR SECT | 903 904 | 27 0E |

| | | | | | |
|---|---|---|---|---|---|
| 149800 | $ | LDAI(B,DSRQ) | DATSRQ CODE | 905 906 | C6 02 |
| 149900 | $ | STA(B,PIAORB) | SETS DATA SERVICE REQ | 907 908 | D7 2E |
| 150000 | $ | CLRE(PIAORB) | TERMINATE | 909 90A 90B | 7F 00 2E |
| 150100 | $TMRMDC11 | LDA (A,PIAORB) | READ B PORT | 90C 90D | 96 2E |
| 150200 | $ | BITI(A,10#) | DATA SERVICE RE-QUEST | 90E 90F | 85 10 |
| 150300 | $ | BNE ($TMRMDC11) | NOT FINISHED | 910 911 | 26 FA |
| 150400 | $ | RTS | | 912 | 39 |
| 151500 | STATUS TO MDC | | | | |
| 151600 | $STATMDC0 | STA(A,STATRG) | STATUS REG. FILE | 91C 91D | 97 62 |
| 151700 | $ | LDAI(A,NDSRQ) | NON-DATA SERVICE REQUEST | 91E 91F | 86 01 |
| 151800 | $ | STA(A,PIAORB) | SET NDSREQ FF VIA PIAB | 920 921 | 97 2E |
| 151900 | $ | CLRE (PIAORB) | TERMIN-ATE | 922 923 924 | 7F 00 2E |
| 152000 | $ | RTS | | 925 | 39 |
| 152200 | INPUT FROM MDC ROM ROUTINE | | | | |
| 152300 | $IPMDC00 | LDXI(0000#) | STARTING ADDRESS OF BUFFER | 926 927 928 | CE 00 00 |
| 152400 | $IPMDC01 | STA (A,MDCXCNTR) | NUMBER OF TRANSFERS | 929 92A | 97 80 |
| 152500 | $IPMDC10 | BSR ($TMRMDC10) | BETWEEN TIMER & MDC | 92B 92C | 8D D2 |
| 152600 | $ | LDA (A,MDCRG) | READ DATA REG. FROM MDC | 92D 92E | 96 60 |

| | | | | | |
|---|---|---|---|---|---|
| 152700 | $ | STAX (A,81#) | STORE IN BUFFER | 92F 930 | A7 81 |
| 152800 | $ | INX | MOVE BUFFER POINTER | 931 | 08 |
| 152900 | $ | DECE (MDCXCNTR) | IS TRANS-FER COMPLETE | 932 933 934 | 7A 00 80 |
| 153000 | $ | BNE ($IPMDC10) | PREPARE FOR NEXT BYTE | 935 936 | 26 F4 |

TABLE-MEMORY MAP-ROM

TASK TABLE LOOK-UP ($TSKTBL)

| | | | | |
|---|---|---|---|---|
| 154600 | CONST (FC#) READ TIMER | | B00 | FC |
| 156700 | CONST (C6#) WAKE UP ONCE | | B15 | C6 |
| 156800 | CONST (CA#) WAKE UP AT INTERVALS | | B16 | CA |
| 157000 | CONST (D9#) WAKE UP BY INTERVALS | | B18 | D9 |
| 157100 | CONST (A5#) TASK ERROR | | B19 | A5 |
| 157700 | CONST (A5#) TASK ERROR | | B1F | A5 |
| 157900 | TASK QUERY ROM ROUTINE | | | |
| 158000 | $TASKQ010 LDA (A,TSKRG) | READ TASK REG | B20 B21 | 96 63 |
| 158100 | $ ANDI (,1F#) | SAFEGUARD | B22 B23 | 84 1F |
| 158200 | $ STA (A,TSKTBLL) | LO ADD OF TASK TABLE | B24 B25 | 97 B1 |
| 158300 | $ LDX (TSKTBLH) | TASK ADDRESS LO CONSTANT | B26 B27 | DE B0 |
| 158400 | $ LDAX (A,00#) | TASK LO CONSTANT | B28 B29 | A6 00 |
| 158500 | $ STA (A,TSKRAL) | TASK ROUTINE ADDRESS LO | B2A B2B | 97 B3 |
| 158600 | $ LDX (TSKRAH) | TASK ROUTINE ADDRESS | B2C B2D | DE B2 |
| 158700 | $ JMPX (00#) | TO ROUTINE | B2E B2F | 6E 00 |

|  |  |  |  | DESIGNATED BY BASE LOC. AND TASK NO. |  |
|---|---|---|---|---|---|

COUNTER INTERRUPT

| 158900 | | INTERRUPT HANDLER QUERY ROM ROUTINE | | | |
|---|---|---|---|---|---|
| 159000 | $IHQ010 | LDA (A,PIACRB) | READ PIA CTRL REG. B | B30 B31 | 96 2F |
| 159100 | $ | BPL ($IHQ020) | NOT EXTERNAL INT. | B32 B33 | 2A 0B |
| 159700 | $IHQ020 | LDA (A,PIACRA) | READ PIA CTRL REG. A | B3F B40 | 96 2D |
| 159800 | $ | BPL ($IHQC100) | NOT FROM MDC | B41 | 2A 0A |
| 159900 | $ | ORAI (A,04#) | | B43 | 8A 04 |
| 160000 | $ | STA (A,PIACRA) | INSURE OUTPUT REG. | B45 | 97 2D |
| 160100 | $ | LDA (A,PIAORA) | RESET IRQA | B47 | 96 2C |
| 160200 | $ | JSRE ($TASKQ010) | | B49 | BD 0B 20 |
| 160300 | $IHQRTIOA | RTI | | B4C | 3B |
| 161100 | $IHQC100 | LDA (A,CNTRSRA) | READ 6840 STATUS | B4D B4E | 96 09 |
| 161200 | $ | BPL ($IHQERR00) | | B4F B50 | 2A 76 |
| 161300 | $ | LSRA | HAS CNTR1 INTER- RUPTED | B51 | 44 |
| 161400 | $ | BCC | NOT CNTR1 TRY NEXT | B52 B53 | 24 1B |
| 163000 | $IHQC200 | LSRA | HAS CNTR2 INTERRUPTED | B6F | 44 |
| 163100 | $ | BCC ($IHQC300) | NOT CNTR2 TRY NEXT | B70 B71 | 24 37 |
| 163200 | CNTR2 MODE = CNTR2 MODE | | | | |
| | 80 = FUTURE  E0 = INTERVAL | | | | |

C0 = INTERVAL  00 = REGULAR

| | | | | | |
|---|---|---|---|---|---|
| 163700 | $ | LDX (CNTR2) | CLEAR CNTR2 FLAGS | B72 B73 | DE 0C |
| 163800 | $ | LDA(B,8(#) | READ CR STORAGE | B74 B75 | D6 8C |
| 163900 | $ | ASLB | | B76 | 58 |
| 164000 | $ | BPL ($IHQRTI0A) | IRQ NOT ALLOWED | B77 B78 | 2A D3 |
| 164100 | $ | LDA (B,CNTR2MDE) | BIT7=0= REGULAR | B79 B7A | D6 A0 |
| 164200 | $ | BPL ($IHQC2I0) | BRANCH IF REGULAR | B7B B7C | 2A 1D |
| 164300 | $ | ASLB | | B7D | 58 |
| 164400 | $ | BPL ($IHQC2F0) | BRANCH IF FUTURE | B7E B7F | 2A 0B |
| 164500 | INTERVAL | | | | |
| 164600 | $IHQC2I0 | JSRE ($TMRTOY00) | TIME OUT YET | B80 B81 B82 | BD 0B E2 |
| 164700 | $ | BPL ($IHQRTI0A) | NO | B83 B84 | 2A C7 |
| 164800 | $ | BSR ($TMRWUNT0) | NEW TIME | B85 B86 | 8D 74 |
| 164900 | $ | LDAI(A,96#) | INTERVAL STATUS | B87 B88 | 86 96 |
| 165000 | $ | BRA ($IHQSTAT0) | STATUS TO MDC | B89 B8A | 20 3E |
| 165100 | FUTURE | | | | |
| 165200 | $IHQC2F0 | JSRE ($TMRTOY00) | TIME OUT YET | B8B B8C B8D | BD 0B F2 |
| 165300 | $ | BPL ($IHQRTI0A) | NO | B8E B8F | 2A BC |
| 165400 | $ | CLRA | | B90 | 4F |
| 165500 | $ | STA (A,CNTR2MDE) | RESET TO REGULAR | B91 B92 | 97 A0 |
| 165600 | $ | JSRE ($TMRWUH00) | HALT CNTR2 | B93 B94 B95 | BD 0C 63 |

| | | | | | |
|---|---|---|---|---|---|
| 165700 | $ | LDAI(A,95#) | FUTURE STATUS | B96<br>B97 | 86<br>95 |
| 165800 | $ | BRA<br>($IHQSTAT0) | STATUS TO MDC | B98<br>B99 | 20<br>2F |
| 168700 | $IHQSTAT0 | JSRE<br>($STATMDC0) | STATUS TO MDC | BC9<br>BCA<br>BCB | BD<br>09<br>1C |
| 168800 | $IHQSTAT1 | LDA<br>(A,PIAORB) | READ PORT B | BCC<br>BCD | 96<br>2E |
| 168900 | $ | BITI(A,20) | NON DATA SERVICE REQ. | BCE<br>BCF | 85<br>20 |
| 169000 | $ | BNE<br>($IHQSTAT1) | NOT FINISHED | BD0<br>BD1 | 26<br>FA |
| 169100 | $ | LDAI(A,80#) | | BD2<br>BD2 | 86<br>80 |
| 169200 | $ | STA<br>(A,STATRG) | READY | BD4<br>BD5 | 97<br>62 |
| 169300 | $IHQRTIOB | RTI | | BD6 | 3B |
| 170300 | TIME OUT YET ROM ROUTINE | | | | |
| 170400 | $TMRTOY00 | JSRE<br>($RDTIME10) | PRESENT TIME TO BUFFER | BE2<br>BE3<br>BE4 | BD<br>0E<br>03 |
| 170500 | $ | LDAI(A,06#) | COUNT | BE5<br>BE6 | 86<br>06 |
| 170600 | $ | LDXI(0081#) | MSB OF BUFFER | BE7<br>BE8<br>BE9 | CE<br>00<br>81 |
| 170700 | CARRY SET IF (M) GREATER THAN (A) ROM ROUTINE | | | | |
| 170800 | $TMRTOY10 | LDAX(B,10#) | FUTURE TIME IN A | BEA<br>BEB | E6<br>10 |
| 170900 | $ | SUBX(B,00#) | PRESENT TIME IN M | BEC<br>BED | E0<br>00 |
| 171000 | | BCS<br>($TMRTOYY0) | PRESENT IS EQUAL OR GREATER | BEE<br>BEF | 25<br>06 |
| 171100 | $ | BNE<br>($TMRTOYN0) | PRESENT IS LESS | BF0<br>BF1 | 26<br>07 |
| 171200 | $ | INX | | BF2 | 08 |

| | | | | | |
|---|---|---|---|---|---|
| 171300 | $ | DECA | | BF3 | 4A |
| 171400 | $ | BNE ($TMRTOY10) | NOT FINISHED | BF4 | 26 F4 |
| 171500 | $TMRTOYY0 | LDAI(A,80#) | GENERATE INTERRUPT | BF6 BF7 | 86 80 |
| 171600 | $ | RTS | | BF8 | 39 |
| 171700 | $TMRTOYN0 | CLRA | NOT FINISHED | BF9 | 4F |
| 171800 | $ | RTS | | BFA | 39 |

172000  GENERATE NEW TIME (INTERVAL)

| | | | | | |
|---|---|---|---|---|---|
| 172100 | $TMRWUNT0 | LDXI(0096#) | LSB ADDRESS | BFB BFC BFD | CE 00 96 |
| 172200 | $ | LDAI(A,06#) | COUNT | BFE BFF | 86 06 |
| 172300 | $ | CLC | CLEAR CARRY | C00 | 0C |
| 172400 | $TMRWUNT1 | LDAX(B,00#) | PRESENT TIME | C01 C02 | E6 00 |
| 172500 | $ | ADCX(B,10#) | ADD INTERVAL | C03 C04 | E9 10 |
| 172600 | $ | STAX(B,00#) | NEW TIME | C05 C06 | E7 00 |
| 172700 | $ | DEX | | C07 | 09 |
| 172800 | $ | DECA FINISHED | | C08 | 4A |
| 172900 | $ | BNE ($TMRWUNT1) | NO | C09 | 26 F6 |
| 173000 | $ | RTS | | C0B | 39 |

175200  LOAD FUTURE TIME ROM ROUTINE

| | | | | | |
|---|---|---|---|---|---|
| 175300 | $TMRLDF00 | LDAI(A,06#) | COUNT | C2B | 86 06 |
| 175400 | $ | LDXI(0010#) | OFFSET FOR XFR TIME | C2D C2E C2F | CE 00 10 |
| 175500 | $ | JSRE ($IPMDC01) | INPUT FROM MDC | C30 C31 C32 | BD 09 29 |
| 175600 | $ | JSRE ($RDTIME10) | TIME TO BUFFER | C33 C34 C35 | BD 0E 03 |

| | | | | | |
|---|---|---|---|---|---|
| 175700 | CARRY SET IF (M) GREATER (A) = ERROR | | | | |
| 175800 | | LDAI(B,06#) | COUNT | C36<br>C37 | C6<br>06 |
| 175900 | | LDXI(0081#) | MSB OF<br>BUFFER | C38<br>C39<br>C3A | CE<br>00<br>81 |
| 176000 | FUTURE TIME LOAD CHECK ROM ROUTINE | | | | |
| 176100 | $TMRFLC00 | LDAX(A,10#) | FUTURE<br>IN A | C3B<br>C3C | A6<br>10 |
| 176200 | $ | SUBX(A,00#) | PRESENT<br>IN M | C3D<br>C3E | A0<br>00 |
| 176300 | $ | BCS<br>($TMRFLCE0) | PRESENT<br>GREATER | C3F<br>C40 | 25<br>06 |
| 176400 | $ | BNE<br>($TMRFLC01) | FUTURE<br>GREATER | C41<br>C42 | 26<br>09 |
| 176500 | $ | INX | | C43 | 08 |
| 176600 | $ | DECB | | C44 | 5A |
| 176700 | $ | BNE<br>($TMRFLC00) | NOT<br>FINISHED | C45<br>C46 | 26<br>F4 |
| 176800 | $TMRFLCE0 | LDAI(A,A4#) | FUTURE<br>ERROR | C47<br>C48 | 86<br>A4 |
| 176900 | $ | JMPE<br>($STATMDC0) | STATUS<br>TO MDC | C49<br>C4A<br>C4B | 7E<br>09<br>1C |
| 177000 | $TMRFLC01 | LDA<br>(A,CNTR2MDE) | ONCE OR<br>AT<br>INTERVALS | C4C<br>C4D | 96<br>A0 |
| 177100 | $ | ASLA | | C4E | 48 |
| 177200 | $ | BPL<br>($TMRWUSC0) | BRANCH<br>IF ONCE | C4F<br>C50 | 2A<br>10 |
| 177400 | COMPUTE INTERVAL (TASK #16) | | | | |
| 177500 | $ | LDAI(B,06#) | BYTE<br>COUNT | C51<br>C52 | C6<br>06 |
| 177600 | $ | LDXI(0086#) | LSB<br>ADDRESS | C53<br>C54<br>C55 | CE<br>00<br>86 |
| 177700 | $ | CLC | CLEAR<br>CARRY | C56<br>C58 | 0C |
| 177800 | $TMRWUG10 | LDAX(A,10#) | FUTURE<br>TIME<br>IN A | C57 | A6<br>10 |

| | | | | | |
|---|---|---|---|---|---|
| 177900 | $ | SBCX(A,00#) | PRESENT TIME IN M | C59 C5A | A2 00 |
| 178000 | $ | STAX(A,20#) | STORE INTERVAL | C5B C5C | A7 20 |
| 178100 | $ | DEX | NEXT BYTE | C5D | 09 |
| 178200 | $ | DECB | FINISHED | C5E | 5A |
| 178300 | $ | BNE ($TMRWUG10) | NO | C5F C60 | 26 F6 |
| 178400 | START COUNTER ROM ROUTINE | | | | |
| 178500 | $TMRWUSC0 | LDAI(A,42#) | IRQ CONTINU-OUS, 16 BITS. | C61 C62 | 86 42 |
| 178600 | $TMRWUH00 | STA (A,XFRBUF1) | FOR CR2 | C63 C64 | 97 81 |
| 178700 | $ | LDXI(03E8#) | 1MS BY INTERNAL CLOCK | C65 C66 C67 | CE 03 E8 |
| 178800 | $ | STX (XFRBUF2) | FOR CNTR2 | C68 C69 | DF 82 |
| 178900 | $ | JSRE ($VLCNTR20) | LOAD CNTR2 | C6A C6B C6C | BD 0D 5E |
| 179000 | $ | RTS | | C6D | 39 |
| 184900 | $VLCNTR20 | LDXI(000C#) | ADDRESS FOR CNTR2 | D5E D5F D60 | CE 00 0C |
| 185000 | $ | LDA (A,XFRBUF1) | 1ST BYTE | D61 D62 | 96 81 |
| 185100 | $ | STA (A,CNTR2CRA) | CNTR2 CRWORD | D63 D64 | 97 09 |
| 185200 | $ | BRA ($LDCNTR00) | | D65 D66 | 20 26 |
| 187400 | CNTR LOAD AND STORAGE ROM ROUTINE | | | | |
| 187500 | $LDCNTR00 | STAX(A,80) | CRSTORAGE | D8D D8E | A7 80 |
| 187600 | $ | LDA (A,XFRBUF2) | 2ND BYTE | D8F D90 | 96 82 |
| 187700 | $ | STAX(A,00#) | CNTR MSB | D91 D92 | A7 00 |

| | | | | | |
|---|---|---|---|---|---|
| 187800 | $ | STAX(A,90#) | CNTR STORAGE MSB | D93 D94 | A7 90 |
| 187900 | $ | LDA (A,XFRBUF3) | 3RD BYTE | D95 D96 | 96 83 |
| 188000 | $ | STAX (A,01#) | CNTR LSB | D97 D98 | A7 01 |
| 188100 | $ | STAX(A,91#) | CNTR STORAGE LSB | D99 D9A | A7 91 |
| 188200 | $ | RTS | | D9B | 39 |
| 191000 | WAKE UP ONCE ROM ROUTINE | | | | |
| 191100 | $TMRWU000 | LDAI(A,80#) | WAKE UP ONCE | DC6 DC7 | 86 80 |
| 191200 | $ | BRA ($TMRWUC000) | | DC8 DC9 | 20 02 |
| 191400 | $TMRWUI00 | LDAI(A,C0#) | WAKE UP AT INTERVALS | DCA DCB | 86 C0 |
| 191500 | $TMRWUC00 | STA (A,CNTR2MDE) | CNTR2 MODE | DCC DCD | 97 A0 |
| 191600 | $ | JSRE ($TMRLDF00) | LOAD FUTURE AND CHECK | DCE DCF DD0 | BD 0C 2B |
| 191700 | $ | RTS | | DD1 | 39 |
| 191800 | HALT CNTR2 | | | | |
| 191900 | $TMRWUHC0 | CLRA | | DD2 | 4F |
| 192000 | $ | STA (A,CNTR2MDE) | RESET TO REGULAR | DD3 DD4 | 97 A0 |
| 192100 | $ | JSRE ($TMRWUH00) | HALT CNTR | DD5 DD6 DD7 | BD 0C 63 |
| 192200 | $ | RTS | | DD8 | 39 |
| 192400 | WAKE UP BY INTERVALS (LOAD INTERVAL TIME) | | | | |
| 192500 | $TMRLDI00 | LDAI(A,E0#) | INTERVAL MODE | DD9 DDA | 86 E0 |
| 192600 | $ | STA (A,CNTR2MDE) | CNTR2 MODE | DDB DDC | 97 A0 |
| 192700 | $ | JSRE | TIME TO | DDD | BD |

|        |              |                        |                       |            |          |
|--------|--------------|------------------------|-----------------------|------------|----------|
|        |              | ($RDTIME10)            | BUFFER                | DDE        | 0E       |
|        |              |                        |                       | DDF        | 03       |
| 192800 | $            | LDAI(A,06#)            | COUNT                 | DE0        | 86       |
|        |              |                        |                       | DE1        | 06       |
| 192900 | $            | LDXI(0020#)            | OFFSET                | DE2        | CE       |
|        |              |                        | FOR                   | DE3        | 00       |
|        |              |                        | INTERVAL              | DE4        | 20       |
| 193000 | $            | JSRE                   | INPUT                 | DE5        | BD       |
|        |              | ($IPMDC01)             | FROM MDC              | DE6        | 09       |
|        |              |                        |                       | DE7        | 29       |
| 193100 | $            | BSR                    | BUFFER TO             | DE8        | 8D       |
|        |              | ($BUFBUF00)            | CMP TIME              | DE9        | 46       |
| 193200 | $            | JSRE                   | NEW TIME              | DEA        | BD       |
|        |              | ($TMRWUNT0)            |                       | DEB        | 0B       |
|        |              |                        |                       | DEC        | FB       |
| 193300 | $            | JMPE                   | START                 | DED        | 7E       |
|        |              | ($TMRWUSC0)            | CNTR2                 | DEE        | 0C       |
|        |              |                        |                       | DEF        | 61       |

READ TIME ROM ROUTINE

|        |              |                        |                       |            |          |
|--------|--------------|------------------------|-----------------------|------------|----------|
| 193600 | $RDTIME00    | (0DFC#)                | READ TIME             | DFC        | 8D       |
|        |              | BSR                    | SUBROUTINE            | DFD        | 05       |
|        |              | ($RDTIME10)            |                       |            |          |
| 193700 | $            | LDAI(A,06#)            | TRANSFER              | DFE        | 86       |
|        |              |                        | COUNT                 | DFF        | 06       |
| 193800 | $            | JMPE                   | TRANSFER              | E00        | 7E       |
|        |              | ($OPMDC00)             | DATA TO MDC           | E01        | 09       |
|        |              |                        | SUBROUTINE            | E02        | 38       |

193900 TIME TO BUFFERS ROM ROUTINE

|        |              |                        |                       |            |          |
|--------|--------------|------------------------|-----------------------|------------|----------|
| 194000 | $RDTIME10    | BSR                    | LATCH                 | E03        | 8D       |
|        |              | ($RDTIME20)            | TIME                  | E04        | 21       |
| 194100 | $            | STA                    | STORE LSB             | E05        | 97       |
|        |              | (A,XFRBUF6)            |                       | E06        | 86       |
| 194200 | $            | BSR                    | LATCH TIME            | E07        | 8D       |
|        |              | ($RDTIME20)            |                       | E08        | 1D       |
| 194300 | $            | CMP                    | 1ST READ              | E09        | 91       |
|        |              | A,XFRBUF6)             | WITH 2ND              | E0A        | 86       |
|        |              |                        | READ                  |            |          |
| 194400 | $            | BEQ                    | BRANCH IF             | E0B        | 27       |
|        |              | ($RDTIME11)            | COMPARE               | E0C        | 02       |
| 194500 | $            | BSR                    | LATCH TIME            | E0D        | 8D       |
|        |              | ($RDTIME20)            |                       | E0E        | 17       |

194600 STORE TIME IN RAM ROM ROUTINE

| | | | | | |
|---|---|---|---|---|---|
| 194700 | $RDTIME11 | STA (A,XFRBUF6) | STORE IN SCRATCHPAD | E0F E10 | 97 86 |
| 194800 | $ | LDA (A,WDENBL) | READ 5TH BYTE | E11 E12 | 96 40 |
| 194900 | $ | STA (A,XFRBUF5) | STORE IN SCRATCHPAD | E13 E14 | 97 85 |
| 195000 | $ | LDA (A,WDENBL) | READ 4TH BYTE | E15 E16 | 96 40 |
| 195100 | $ | STA (A,XFRBUF4) | STORE IN SCRATCHPAD | E17 E18 | 97 84 |
| 195200 | $ | LDA (A,WDENBL) | READ 3RD BYTE | E19 E1A | 96 40 |
| 195300 | $ | STA (A,XFRBUF3) | STORE IN SCRATCHPAD | E1B E1C | 97 83 |
| 195400 | $ | LDA (A,WDENBL) | READ 2ND BYTE | E1D E1E | 96 40 |
| 195500 | $ | STA (A,XFRBUF2) | STORE IN SCRATCHPAD | E1F E20 | 97 82 |
| 195600 | $ | LDA (A,WDENBL) | READ MSB BYTE | E21 E22 | 96 40 |
| 195700 | $ | STA (A,XFRBUF1) | STORE IN SCRATCHPAD | E23 E24 | 97 81 |
| 195800 | $ | RTS | | E25 | 39 |
| 195900 | LATCH TIME ROM ROUTINE | | | | |
| 196000 | $RDTIME20 | LDAI(A,LATCH) | SETS UP LATCH TIME | E26 E27 | 86 03 |
| 196100 | $ | STA (A,PIAORB) | LATCHES THE TIME VIA PIA B | E28 E29 | 97 2E |
| 196200 | $ | CLRE (PIAORB) | TERMINATES | E2A E2B E2C | 7F 00 2E |
| 196300 | $ | LDA (A,WDENBL) | READ LSB BYTE | E2D E2E | 96 40 |
| 196400 | $ | RTS | | E2F | 39 |
| 196500 | BUFFER TO BUFFER TRANSFER | | | | |
| 196600 | $BUFBUF00 | LDAI(A,06#) | BYTE COUNT | E30 E31 | 86 06 |
| 196700 | $ | LDXI(0086#) | LSB ADDRESS | E32 E33 E34 | CE 00 86 |

| | | | | | |
|---|---|---|---|---|---|
| 196800 | $BUFBUF10 | LDAX(B,00#) | FROM BUFFER | E35 E36 | E6 00 |
| 196900 | $ | STAX(B,10#) | TO BUFFER | E37 E38 | E7 10 |
| 197000 | $ | DEX | | E39 | 09 |
| 197100 | $ | DECA | | E3A | 4A |
| 197200 | $ | BNE ($BUFBUF10) | NOT FINISHED | E3B E3C | 26 F8 |

Before describing the operation of the present invention, in processing a variety of different types of task words received from MDC 10, it is important first to describe the different types of task words. The task word commands pertinent to an explanation of the present invention include the following:

1. 10# Load time of day timer—This command causes adapter 20 to load the time of day section 24 in 6 bytes starting with the most significant byte.

2. 12# Load counter #2—This command causes the adapter 20 to load 3 bytes of data starting with byte 1 control register #2 (CR2), followed by byte 2, most significant byte of counter data and then byte 3, the least significant byte of counter data.

3. 15# Load timer interval (wake up once)—This command causes the adapter 20 to load 6 bytes of data containing the 48-bit time of day count such that $T_2$ (new time) is greater than $T_1$ (time of day). When adapter 20 detects that $T_2$ is less than $T_1$, it generates an interrupt to MDC 10 with an error status code. Upon detecting that $T_2 = T_1$, adapter 20 interrupts MDC 10 with a counter interrupt status code.

4. 16# Load repetitive timer interval (wake up at intervals)—This command causes adapter 20 to load 6 bytes of data as in response to task #15 above. When adapter 20 detects that $T_2$ is less than $T_1$, it interrupts MDC 10 with an error code. Adapter 20 generates interrupts to MDC 10 via interval time interrupt codes at a repetitive rate of $\Delta T$ where $\Delta T = T_2 - T_1$ (i.e., $T = T_1 + n\Delta T$ where $n = 0, 1, 2$, etc.)

5. 17# Stop current timer function.

6. 18# Load repetitive timer interval (wake up by intervals)—This command causes adapter 20 to load 6 bytes of data containing a 48-bit time increment in milliseconds which corresponds to $\Delta T$ specified by task #16. Adapter 20 generates an interrupt via an interval time interrupt code every $\Delta T$ time interval until terminated by receipt of task #17, master clear or initialize signal from MDC 10.

By means of these commands, CPU 14 is able to transfer control of timing operations to MDC 10 and control its normal processing. This relieves CPU 14 from having to expend valuable processing time in carrying out time of day processing operations.

It will be assumed that adapter 20 receives a task #15. That is, MDC 10 applies the task byte $15_{16}$ to the lines ALUOT0-7 and forces line LODAS1 to a binary ONE.

The signal LODAS110 is loaded into the second stage of register 210-14 of FIG. 3a, upon the positive edge or rise of clock signal CLKSTB10. The signal LOADAS110 remains stored in register 210-14 for one clock interval.

The signal TASKIT10 from register 210-14 forced to a binary ZERO sets the TASKID flip-flop 210-18 to a binary ONE. It also causes AND gate 210-16 to force signal CCLDAT10 to a binary ZERO. The negative going edge or fall of signal CCLDAT10 clocks the task word byte $00_{16}$ into data-in register 214 of FIG. 2.

The binary ONE signal TASKID10 is applied to the CA1 terminal of PIA 235 causes the setting of the interrupt flag bit 7 of the PIA control register A. This causes PIA 235 to force its IRQ(A) terminal to a binary ZERO which results in interrupt request signal INTREQ00 being forced to a binary ZERO. As seen from FIG. 2, the interrupt signal is applied to the IRQ terminal of MPU 224.

It will be assumed in this example that the MPU 224 is idle executing a wait instruction sequence awaiting an interrupt. The interrupt sequence is conventional and may be considered similar to interrupt processing described in the publication "Basic Microprocessors and the 6800" referenced previously.

Upon the occurrence of the interrupt, MPU 224 branches to an interrupt handler sequence for determining the cause of the interrupt as explained herein. That is, MPU 224 applies address vectors $FF8_{16}$ and $FF9_{16}$ to the address bus lines BIAD04 through BIAD15. This reads out the RAM location interrupt address from the specified PROM 227 location which corresponds to the start of the interrupt handler routine which is going to service the interrupt. The contents of FF8 and FF9 are loaded into the program counter (PC) and thereafter applied to the address bus for fetching the first instruction of the interrupt handler routine of the lines 158900-160300).

This routine includes a series of load (LDA) and branch (BPL) instructions for reading the various PIA control registers and testing for various conditions to establish the source of the interrupt.

The addresses $B30_{16}$ and $B31_{16}$ store the bytes of an LDA instruction specifying the transfer of the contents of PIA 235 control register B into the accumulator of MPU 224. The control register B is used for indicating an external interrupt. Since this is an interrupt from MDC 10, the MPU 224, under the control of the interrupt handler ROM routine, branches to address locations $B3F_{16}$ and $B40_{16}$. These locations store the bytes of another LDA instruction which calls for the transfer of the PIA 235 control register A to the MPU accumulator.

In greater detail, the operand at location $B40_{16}$ contains as the byte, the value "$2D_{16}$" or $00101101_2$. When read out BIAD05-15 onto the address bus lines, the low order bits $01_2$ are applied to the signal lines BIAD14 and BIAD15 respectively. These signals applied to the RS0 and RS1 input terminals of PIA 235 selects for read out, the contents of the control register A onto the data bus lines LBDT00-07. The contents are applied to the MPU 224 accumulator A for testing the state of bit 7.

Since bit 7 is a binary ONE, indicating a task interrupt from MDC 10, MPU 224 executes a jump to subroutine (JSRE) instruction stored at the byte locations specified by addresses B49$_{16}$, B4A$_{16}$ and B4B$_{16}$. This causes MPU 224 to branch to address B20$_{16}$ which is the start of the task query ROM subroutine $TASKQ010 at line 158000. During the execution of the JSRE instruction, MPU 224 loads the return address bytes 0B4C into successive locations of the stack storage specified by the stack pointer register contents.

It is seen that the first instruction of the $TASKQ010 routine is an LDA instruction stored at address B20. The address value 63$_{16}$ contained in the instruction is applied to address bus lines BIAD05-15. This forces address signals BIAD0910 and BIAD1010 to binary ONES and signals BIAD0710 and BIAD0810 to binary ZEROS. It is seen from FIG. 3b that these signals together with signal BIXVMA10 a binary ONE enable decoders 230-4 and 230-6 and result in signal DATFL000 being forced to a binary ZERO. This, in turn, forces sgnal DATAIP10 to a binary.

The task word 15$_{16}$ loaded into data-in register 214 is applied to data bus lines LBDT00-07 in response to signal DATAIP10 and transferred to the MPU 224 accumulator. Also, MPU 224 read/write signal BIRW0010 is a binary ZERO at this time. This causes NAND gate 230-22 to force signal RAMWRI00 to a binary ZERO enabling RAM 226 for a write cycle of operation.

During the initialization sequence, adapter 20 loaded address location B0$_{16}$ with the value 0B$_{16}$ and location B2 with the value 0D$_{16}$. The value 0D$_{16}$ corresponds to the high order byte of the ROM routine which processes the task. The value 0B$_{16}$ corresponds to the high order byte of the task table.

As seen from lines 15800-158700, MPU 224 reads the contents of the data-in register (task register) into the A accumulator and from there into location B1. The MPU 224 loads the contents of locations B0 and B1 (0B15$_{16}$) into the index register and stores the contents of location 0B15$_{16}$(C6) into location B3. Thereafter, MPU 224 loads the contents of locations B2 and B3 (0DC6) into the index register which branches MPU 224 to the start of the wake up once ROM routine $TMRWU000. As seen from lines 191000-191600, MPU 224 loads a constant 80# into the A accumulator and executes a branch BRA instruction.

This causes it to begin ROM routine $TMRWUC00. During this routine, MPU 224 executes an STA instruction which loads the constant 80# into location A0. As seen from line 10700, the contents of this location establishes the counter 2 mode of operation.

From lines 191400 and 192500, it is seen that when the task words received are a task #16 and task 190 18, the values C0 and E0 respectively are loaded into location A0. Thus, the next three modes, wake up once, wake up at intervals and wake up by intervals are defined by the value loaded into the counter 2 mode register location A0.

As seen from line 191600, MPU 224 executes a jump to subroutine (JSRE) instruction which branches MPU 224 to the load future and checks ROM routine ($TMRLDF00) at the starting address 0C2B. During the execution of the JSRE instruction, MPU 224 loads return address bytes 0DD1 into the stack byte locations specified by the contents of the stack pointer register.

As seen from line 175300, MPU 224 executes the LDAI instruction fetched from locations C2B and C2C which loads the value 06 into the A accumulator. Next, MPU 224, in response to a load index register (LDXI) instruction, loads the 16-bit constant value hexidecimal 0010. Then, MPU 224, via a JSRE instruction, branches to an input from MDC ROM routine $IPMDC01 which begins at address 0929. Also, during the execution of the JSRE instruction, MPU 224 again loads return address bytes 0C33 into the stack byte locations specified by the stack register contents.

The ROM routine $IPMDC01 via the STA instruction causes the constant value 06 from the A accumulator specifying the number of bytes to be transferred to be loaded into location 80. This location stores the MDCXCNTR constant. Next, MPU 224 executes a BSR instruction which branches it to the timer and MDC ROM routine $TMRMDC10 which starts at address 8FF (see line 152500). During the execution of the BSR instruction, MPU 224 loads return address bytes 092D into the stack byte locations specified by the stack pointer register.

As seen from lines 149500-150400, MPU 224 executes the sequence of instructions which sets the data service request DATSRQ flip-flop and tests its state for determining when MDC 10 has loaded a first byte via the lines AULUOT0-7 into data-in register 214. The DATSRQ flip-flop 210-12 remains set until the data byte is loaded at which time MDC 10 forces line LODADR to a binary ONE. As seen from FIG. 3a, this forces signal LODARD02 to a binary ZERO. This causes inverter circuit 210-24 to force signal CLNDRQ00 to a ZERO clearing DATSRQ flip-flop 210-12 to a binary ZERO.

This causes MPU 224 to execute the RTS instruction which returns it to its original location plus 2. The return location corresponds to the return address byte value 092D. Next, MPU 224 executes the LDA instruction fetched from locations 92D and 92E. This causes the byte stored in the data-in register 214 to be loaded into the A accumulator via the data bus lines LBDT00-07 in response to signal DATAIP10. More specifically, the constant value 60 applied to the bus address lines causes the decoder circuits 230-2 through 230-6 of FIG. 3b to force signal DATFL000 to a binary ZERO. This, in turn, forces signal DATAIP10 to a binary ONE which applies the data byte to the data bus lines.

In response to the STAX instruction, MPU 224 stores the A accumulator data byte contents into memory address #91 specified by the index register contents (#0010) plus hexidecimal 81). After incrementing the index register contents by one, in response in the INX instruction, MPU 224 executes a DECE instruction which decrements by one the contents of location 80. Since the transfer is not complete, MPU 224 branches to ROM routine $IPMDC10 to fetch the next data byte. When all 6 bytes have been loaded into RAM future buffer locations 91# through 96#, MPU 224 executes the RTS instruction which returns it to its original location plus three. The return location is established by the return address byte value 0C33. As seen from line 175600, the MPU 224 executes another JSRE instruction which branches it to the read time ROM routine $RDTIME10. Briefly, this routine latches the time of day value into latch register 246 of counter section 48, in response to signal LATCH10 generated by the sequence of instructions LDAI, STA and CLRE. Thereafter, the time of day value is transferred a byte at a time into the A accumulator and written into the RAM transfer buffer locations 81 through 86 (see lines 8700-9400). For further details as to how the read operation is accomplished reference may be made to the copending patent application "A Real Time Adapter Unit for Use in a Data Processing System", invented by Boyd E. Darden and Henry F. Hartley, Ser. No. 73,058, filed on Sept. 6, 1979.

After the 6 time of day bytes have been stored, MPU 224 executes the LDAI instruction fetched from locations C36 and C37 (see line 175800). This loads the byte count into the B accumulator while the LDXI instruction loads the index register with the address 0081# which corresponds to the most significant byte stored in the transfer buffer storage.

Next, MPU 224 begins its execution of the future time load check ROM routine $TMRFLC00. This ROM routine subtracts from each byte of the future time value received from MDC 10, the corresponding time of day byte value obtained from counter 248 to determine that the time of day value sent by the CPU 14 is a future time. The LDAX instruction loads the byte of the future time value into the A accumulator while the SUBX instruction subtracts the time of day byte read out from the transfer buffer.

When a carry indication is set following the subtract, a branch is made to ROM routine $TMRFLCEO for indicating an error condition. This means the future time received from MDC 10 was a past time. As seen from lines 176800-176900, this causes MPU 224 to branch to the status to MDC ROM routine $STATMDC0. However, when a zero indication is not set signaling the values are not equal (i.e., future must be greater), MPU 224 branches to ROM routine $TMRFLC01.

As seen from lines 151500-152000, this routine causes the generation of a time error code A4 for indicating in the case of a task #15 or task #16 that the time of day value received from MDC 10 is less than the present time of day value obtained from counter section 24. That is, the A4 code loaded into the A accumulator is loaded into the status register location #62 (see line 8300). Then, MPU 224 loads the constant "01" into the A accumulator and transfers the value to the lines COUNTA-D via the peripheral data register B of PIA 235. This causes the circuits of block 241 to force signal SREQCK10 to a binary ONE switching the non-data service NDSRQ flip-flop 210-10 to a binary ONE. The MPU 224 then returns back to the task interpreter routine and then to the interrupt handler routine to await further action by MDC 10.

Assuming no error condition, MPU 224 executes the BNE instruction which causes a branch to ROM routine $TMRFLC01. During the execution of this sequence, MPU 224 determines whether the operation being executed is repetitive or not repetitive (i.e., count once or count a number of times). The most significant bit of the counter 2 mode register is shifted into the C bit position of the condition code register while the N bit position stores the next most significant bit of the mode register. This causes MPU 224 to branch to the start counter ROM routine $TMRWUSC0 (see line 178500) in response to the N bit position which stores a binary ZERO.

As seen from lines 178500-179000, MPU 224 loads the constant value 42# into the A accumulator which is in turn loaded into memory buffer location 81#. This is the constant value which is to be loaded into counter 2 control register (CR2). Next, MPU 224 loads the constant value 03E8# into memory buffer locations 82 and 83. It then branches to load counter 2 ROM routine $VLCNTR20 which starts at address OD5E.

From line 184900, it is seen that MPU 224 loads its index register with the constant value 000C# which corresponds to the address of the MSB buffer register of timer module 280. Next, MPU 224 loads the A accumulator with the control register 2 constant value 42# read out from location 81#. In response to the STA instruction, MPU 224 loads control register 2 with the value 42#. That is, the value 09# applied to the address bus lines causes the decoder circuits 230-2 through 230-6 of FIG. 3b to force signal EN684000 to a binary ZERO. Also, the address signals 001 applied to the RS0-RS2 terminals cause the selection of control register 2. At this time, the signal BIRW0012 from selector circuits 230 is a binary ZERO while the address signal BIAD1210 applied to the CS1 terminal is a binary ONE.

The above causes the value 42# to be written into control register 2. The value "01000010" establishes the mode of operation for the timer as follows: the timer operates continuously (bits 3 and 5=0), the timer uses the enable clock (bit 1=1), it is configured by normal (16-bit) counting (bit 2=0) and the interrupt flag is enabled (bit 6=1).

Next, MPU 224 branches to the counter load and storage ROM routine which starts at address OD8D (see line 187500). This routine loads the two 8-bit bytes into counter 2 after storing the control register 2 into location 8C# specified by the contents of the index register (000C+0080). MPU 224 loads the value 03# into the A accumulator read out from location 82. Next, MPU 224 loads the A accumulator contents into addresses (OC#) and 9C# specified by the index register in accordance with the STAX instruction. The address OC#, applied to the address bus lines, causes the decoder circuits 230-2 through 230-6 of FIG. 3b to force signal EN68400 to a binary ZERO. Also, address signals 100 applied to the RS0-RS2 terminals cause the selection of the MSB buffer register. At this time, signal BIRW0012 from selector circuits 230 is a binary ZERO while address signal BIAD1210 applied to the CS1 terminal is a binary ONE. This causes the MSB value to be written into the MSB buffer register. Next, the value E8# read out of location 83 is loaded into the A accumulator. The MPU 224 loads the byte contents of the A accumulator into addresses OD# and 9D# specified by the sequence of STAX instructions.

In greater detail, the address OD# applied to the address bus lines causes the decoder circuits 230-2 through 230-6 of FIG. 3b to force signal EN68400 to a binary ZERO. Also, address signals 101 applied to the RS0-RS2 terminals cause the MSB buffer register contents to be loaded automatically into the timer 2 most significant byte position while the least significant byte is loaded into timer 2 most significant byte position from data bus lines D0-D7.

As time time, timer counter 2 has been loaded with , 16-bit value for providing one millisecond time interval. Every time the timer counter 2 overflows or times out, it causes the setting of the interrupt flag bit associated therewith and reinitializes itself. Since bit 6 of control register 2 is a binary ONE, this causes the timer module 280 to interrupt MPU 224 by forcing the IRQ interrupt line to a binary ZERO.

Following completion of ROM routine $LDCNTR00, MPU 224 returns to the task interpreter routine and then via the interrupt handler routine to a wait loop to await further activity.

It is assumed that counter 2 has overflowed causing an interrupt to be generated. The interrupt causes MPU 224 to center the interrupt handler query ROM routine $IHQ010. As previously described, MPU 224 reads out the RAM location interrupt address from the specified PROM 227 location which branches MPU 224 to interrupt handler query ROM routine $IHQ010. Since the interrupt is an interval interrupt (not external or from MDC 10), MPU 224 branches to ROM routine $IHQC100 in response to the BPL instruction fetched from locations B41 and B42.

As seen from line 161100, MPU 224 executes an LDA instruction which reads the contents of the timer module status register into the A accumulator. In greater detail, the address value 09 applied to the address bus lines BIAD15-05 causes the decoder circuits 230-2 through 230-6 of FIG. 3b to force signal EN684000 to a binary ZERO. The value 001 applied to the terminals RS2-RS0 together with signal BIRW0012 being forced to a binary ONE causes the contents of the timer module status register to be applied to the bus lines LBDT00-07.

MPU 224 tests the status register contents via a BPL instruction. Since there is an interrupt, MPU 224, in response to a logical shift right (LSRA) instruction, shifts all the bits of the A accumulator one bit position to the right. The state of bit position 0 is stored in the C bit position of the MPU condition code register. Since this bit which corresponds to the timer 1 interrupt flag is a zero, MPU 224 executes a second LSRA instruction. Since this bit which corresponds to the timer 2 is a binary ONE, MPU 224 executes the LDX instruction fetched from locations B72 and B73.

The LDX instruction reads the contents of timer 2 counter onto the data bus lines. In greater detail, the address value "OC" applied to the address bus lines BIAD15-05 causes the decoder circuits 230-2 through 230-6 of FIG. 3b to force signal EN684000 to a binary ZERO. The value "100" applied to the terminals RS2-RS0 together with signal BIRW0012 being forced to a binary ONE generates a read timer counter command. This causes the timer module 280 to clear the timer 2 interrupt flag bit 1 to ZERO, since the timer status register previously had been read while the interrupt flag was set.

Next, MPU 224 reads the contents of the counter 2 CR storage location 8C# from RAM 226 into the B accumulator. In response to an ASL instruction, MPU 224 shifts the contents of the B accumulator by one bit position to the left. This loads the most significant bit 7 into the C bit of the MPU condition code register.

Since interrupts are being allowed (i.e., bit 7 of CR storage is a binary ZERO), MPU 224 fetches the LDA instruction from locations B79 and B7A. This loads the contents of the counter 2 mode location A0 into the B accumulator. Since the timer 2 counter is being used in one of three modes and not in a regular mode (only as a counter), MPU 224 instead of branching executes an ASLB instruction which shifts the B accumulator contents by one bit position to the left.

As discussed above, the value 80 was loaded into counter 2 mode location A0. Therefore, MPU 224, in response to the BPL instruction, branches to ROM routine $IHQC2F0. This routine determines whether the time of day counter has reached the future time of day values received from CPU 14. As seen from line 165200, MPU 224 executes the JSRE instruction fetched from locations B8B-B8D. This causes MPU 224 to branch to the ROM routine $TMRTOY00. During the execution of the JSRE instruction, MPU 224 stores the return address values 8E and OB in successive byte locations of the stack storage of RAM 226 specified by the contents of the stack pointer register. As each byte of the return address is loaded into the stack, the stack pointer is decremented by one.

The $TMRTOY00 routine, as seen from line 170400, reads the time of day counter value from time of day counter section 24. That is, the JSRE instruction fetched from locations BE2-BE4, causes MPU 224 to branch to the read time ROM routine $RDTIME10. In the manner previously described, MPU 224 latches the time of day value into latch register 2 and thereafter loads the value a byte at a time into transfer buffer locations 81# through 86# (see lines 8800-9300).

Upon returning to ROM routine $TMRTOY00, MPU 224, in response to an LDAI instruction, loads the count value 06# into the A accumulator. Next, MPU 224 loads its index register with the address 81# which corresponds to the most significant byte location of the transfer buffer.

MPU 224 fetches the LDAX instruction from locations BEA and BEB of ROM routine $TMRTOY10. This routine checks to determine whether the present time of day value read from counter section 28 is equal to or greater than the future time of day value. This causes MPU 224 to load the first byte of the future time of day value fetched from buffer location 91# into the A accumulator. Then MPU 224 subtracts the first byte fetched from the transfer buffer location 81 loaded into the B accumulator.

When the present time of day value is equal or greater than the value, the BCS instruction causes MPU 224 to branch to ROM routine $TMRTOYY0. The LDAI instruction fetched from locations BF6 and BF7 load the constant value 80# into the A accumulator. When the present time of day value is less, MPU 224 executes the BNE instruction which results in the clearing of the A accumulator to ZERO.

The MPU 224, in response to the RTS instruction, returns to its original location plus 3. The return location is defined by the return address bytes 0B and 8E previously stored in the stack (see line 165300). Next, MPU 224 executes a BPL instruction and based upon the value stored in the A accumulator branches to ROM routine $IHQRTIOA. When the A accumulator contains an 80, MPU 224 executes a CLRA instruction clearing the accumulator because the task has been completed.

Thereafter, MPU 224, in response to an STA instruction, clears the counter 2 mode location A0 to ZEROS and branches to ROM routine $TMRWUH00, in response to the JSRE instruction. During the execution of this instruction, return address bytes are stored in the stack. This routine is used to halt counter 2 operation. As seen from line 178600, MPU 224 loads ZEROS into location 81 and the value 03E8 into the MPU index register. From there, the value 03E8 in the index register is loaded into locations 82 and 83 in response to an STX instruction.

MPU 224, in response to a JSRE instruction, branches to ROM routine $VLCNTR20. As seen from line 184900, MPU 224 loads the register address 000C# for counter 2 located within timer module 280 into its index register, in response to the LDXI instruction. Next, MPU 224 loads the first byte which now contains all ZEROS into the A accumulator. The all ZERO value is thereafter loaded into the control register associated with counter 2, in the manner previously described (i.e., in response to address 09). The all ZERO value halts counter 2 operation.

As seen from line 185200, MPU 224 branches to ROM routine $LDCNTR00 which loads the all ZERO value into CR storage location 80. Thereafter, the millisecond byte value stored in locations 82 and 83 are loaded into counter 2 completing the halt operation. MPU 224 returns via RTS instructions to future ROM routine $IHQCZF0.

As seen from line 165700, MPU 224 executes an LDAI instruction which loads a status code 95# into the A accumulator. Next, MPU 224 branches to status ROM routine $IHQSTAT0 which transfers the status code to the MDC 10 indicating that the task has been completed. That is, the time of day value at which CPU 14 requested an interrupt has been reached. Accordingly, the MDC 10, upon receipt of the status code is operative to generate an interrupt to CPU 14. Thus, it can be seen from the foregoing that the CPU 14 is relieved from performing tasks relating to timer operations.

In those cases where CPU 14 requires the generation of interrupts on a periodic or repetitive basis, it forwards to MDC 10 a task code of 16# or 18#. Both tasks are processed by MPU 224 in a similar fashion. However, it is important to note that task #18 provides a more accurate interval. This will be seen from the following explanation.

To process the task word $16_{16}$, MPU 224 references the ROM routine $TMRWUI00 which begins at address ODCA. This loads the constant C0 into counter 2 mode location A0 (see line 191500). Then, as in the case of task word $15_{16}$, MPU 224 branches to the load future and check ROM routine $TMRLDF00 and then to other ROM routines referenced as in the case of task word $15_{16}$.

However, during the execution of ROM routine $TMRFLC01, MPU 224 does not branch to ROM routine $TMRWUSC0, in response to the BPL instruction fetched from locations C4F and C50. Instead, MPU 224 executes a series of instructions which compute the time interval by subtracting the present time of day value from the future time of day value received from MDC 10 (see lines 177400-178300). In greater detail, in response to the LDAI instruction, MPU 224 loads the byte count value 06# into the B accumulator. Next, MPU 224 loads the address of the least significant byte location 0086# of the transfer buffer into its index register. In response to the CLC instruction, MPU 224 clears the C bit of its condition code register to ZERO.

During the execution of ROM routine $TMRWUG10, MPU 224, in response to the LDAX instruction, loads the least significant byte of the future time of day value stored in location 96 into the A accumulator. In response to the SBCX instruction, MPU 224 subtracts the least significant byte of the present time of day value stored in transfer buffer location 86 and the contents of the C bit from the A accumulator (i.e., future LSB value). The result stored in the A accumulator is then stored in interval buffer location A6 (see line 10800), in response to the STAX instruction.

In response to the DEX and DECB instructions, MPU 224 decrements the contents of the index register and the byte count contents of the B accumulator by one. Since the count is not zero, MPU 224, in response to the BNE instruction, branches to location C57 to continue the subtraction. When all 6 bytes have been processed, and the interval stored in locations A1-A6, MPU 224 begins execution of the start counter ROM routine $TMRWUSC0. As in the case of task word $15_{16}$, after the various registers within timer module 280 have been loaded in addition to those in RAM 226, MPU 224 returns to a wait state.

Upon the generation of an interrupt by timer module 280, MPU 224, after establishing that the interrupt was produced by counter 2, begins the execution of ROM routine $IHOC2I0 (see line 164600). This causes MPU 224 to branch to the time out routine $TMRTOY00 to establish whether there was a time out. As discussed above, MPU 224 reads a time of day value from section 24 and loads it into the transfer buffer locations within RAM 226. This value is compared to the future time of day value to establish whether the present time of day is equal to or greater indicative of a time out. Assuming there is, MPU 224 then branches to ROM routine $TMRTOYY0 to generate an interrupt.

Upon returning to ROM routine $IHQC2I0, MPU 224 branches to new time ROM routine $TMRWUNT0 (see line 172100). This ROM routine causes the MPU 224 to generate a new time interval by adding to the present time of day value stored in the transfer buffer locations, the interval values stored in locations A6-A1. MPU 224 stores the resulting new time in future buffer locations 96-91.

Upon completing the generation of the new time value, MPU 224 returns to ROM routine $IHQC2I0. It then loads an interval status code #96 into the A accumulator and branches to status ROM routine $IHQSTAT0 which transfers the status code to MDC 10 indicating the interval time out.

It will be appreciated that in the case of task 16, the interval used may not be as accurate as required in certain cases. For example, CPU 14 establishes that it wants to be interrupted every two hours, and the first interrupt is to occur at 11 o'clock which corresponds to the future time of day value. Instead of transferring the request, including the future time of day value at 9 o'clock, it could be inadvertently transferred at 8:30 or 9:15, etc. Because adapter 20 utilizes the time of day value to determine the interval, any inaccuracy in this value in turn causes inaccuracies in the occurrences of the requested interrupt.

In accordance with the teachings of the present invention, task word $18_{16}$ is provided to obviate the introduction of the above inaccuracies. In this case, CPU 14 in a conventional manner determines the time of day interval and forwards this value to MDC 10. In response to task word $18_{16}$, adapter 10 adds the interval to the present time of day value obtained from section 24. This new time of day value is then stored in locations A6-A1 of RAM 226.

In greater detail, MPU 224 in response to the task word $18_{16}$ branches to ROM subroutine $TASKQ010 at line 158000. In the manner previously described, MPU 224 loads the value $ODD9_{16}$ into its index register. Then, MPU 224 branches to the wake up by intervals ROM routine $TMRLDI00 (see line 192500). This loads the constant value E0 previously loaded into the A accumulator into counter 2 mode register location A0.

Next, MPU 224 jumps to the read time ROM routine $RDTIME10 wherein it reads the present time of day value from the counter circuits of section 24. The present time of day value is thereafter written into the transfer buffer locations 86#-81#. MPU 224 then loads the byte count value 06# into the A accumulator and the value hexidecimal 20 into the index register.

As seen from line 193000, MPU 224 branches to the input from MDC ROM routine $IPMDC01 (see line 152300). In response to this routine, MPU 224 loads the time of day inteval bytes received from MDC 10 into the interval buffer locations A1-A6 of RAM 226 specified by the address contents of the index register. Next, MPU 224 branches to the buffer to CMP time ROM routine $BUFBUF00 (see line 196600). This ROM routine transfers the present time of day bytes stored in transfer buffer locations 86-81 into the corresponding ones of the future buffer locations 96-91.

As seen from line 193200, MPU 224 branches to the new time ROM routine $TMRWUNT0 which in the manner previously described generates the new time of day value by adding the time of day interval value obtained from locations A6-A0 to the present time of day value previously stored in locations 96-91. The new time of day value is then stored in future buffer locations 96-91.

Next, as in the case of task word $16_{16}$, MPU 224 branches to the start counter 2 ROM routine $TMRWUSC0 which loads the various counter 2 registers of timer module 280 and register locations within RAM 226. MPU 2224 returns to a wait state for processing the next task. When MPU 224 receives an interrupt from timer counter 2, it is processed in the manner described with reference to task word $16_{16}$. However, since the time of day interval was accurately established, CPU 14 will receive interrupts generated at successive intervals which are accurately and reliably selected.

It is seen how the adapter of the present invention provides accurate and reliably generated time of day interrupts to a CPU in a manner which does not appreciably add to the processing time of the CPU. The adapter relieves the CPU of the burden of having to monitor and update values. Moreover, in accordance with the present invention, the CPU is able to request interrupts on the basis of any period of time (e.g. hours, days, weeks or years) thereby providing greater flexibility in carrying out its tasks without having to be concerned with any increase in processing time.

It will also be appreciated that the invention utilizes a number of standard integrated circuit chips which simplifies and reduces construction costs. Moreover, it will be noted that the arrangement of the invention requires utilization of only one counter of the timer module. Hence, the remaining counters may be programmed to carry out a number of other types of operations, internal as well as external in parallel with the time of day operations.

It will be appreciated by those skilled in the art that many changes may be made to the preferred embodiment of the present invention. For example, other chips similar in function may be used to construct the adapter of the present invention.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A data processing system including a central processing unit and a controller coupled in common to a bus, said controller having a number of ports connected to a corresponding number of adapter units, one of said adapter units comprising:
a data bus;
an address bus;
microprocessing means coupled to receive task word commands from said controller coded to specify a number of time of day operations and including time of day information signals, said microprocessing means being coupled to said data and address buses;
random access memory means coupled to said data and address buses, said memory means being organized into a plurality of sections, each section having a plurality of locations, a first section corresponding to a first buffer, a second section corresponding to a second buffer, a third section corresponding to a third buffer and a fourth section corresponding to a timer control section;
a programmable read only memory means coupled to said data and address buses, said read only memory means including a plurality of locations for storing a plurality of timer control sequences for processing different ones of said commands;
free running time of day means for generating and storing time of day values, said time of day means being coupled to said data bus and operatively coupled to said address bus; and,
timer module means coupled to said microprocessing means and to said data and address buses, said module means including a number of programmable cyclic timer circuits, each timer circuit including control and counter registers operatively coupled to said address and data buses;
said microprocessing means being operative in response to one of said task commands to reference a first predetermined one of said plurality of timer control sequences for generating signals to load predetermined time of day information signals received from said controller required for executing the time of day operation specified by said command into a selected one of said buffers and for generating signals on said address and data bus lines for loading said timer control and counter registers of one of said timer circuits with control signals read out from said fourth section specifying a timer mode of operation and a predetermined time interval in accordance with said one command, said timer module means being conditioned by said control signals to generate an interrupt at the end of said predetermined time interval to said microprocessing means for detecting the completion of the time of day operation specified by said one command.

2. The system of claim 1 wherein said free running time of day means is being updated at a predetermined millisecond rate, said predetermined time of day information being coded into values representative of the year, month, day, hours and seconds and said predetermined time interval corresponding to a value no greater than said predetermined millisecond rate.

3. The system of claim 1 wherein said free running time of day means includes:
a binary counter for generating a time of day value;
free running clock circuit coupled to said binary counter for generating clock signals for updating said time of day value stored in said counter at a millisecond rate;
an output latch register coupled to said counter and to said data bus; and
decoder circuit means coupled to said data bus and to said latch register, said microprocessing means in response to said interrupt being operative to reference a predetermined one of said plurality of timer control sequences for generating signals on said address and data buses for storing in said output latch register the present time of day value read from said binary counter and for transferring said present time of day value into said first buffer for detecting said completion of said time of day operation specified by said one command.

4. The system of claim 3 wherein said one command is coded to specify a single time of day operation, said predetermined one of said plurality of timer control sequences including instructions which upon being read out from said read only memory means condition said microprocessing means to compare each of the bytes of said time of day value stored in said first buffer with a corresponding one of said bytes of the future time of day value stored in said second buffer, said microprocessing means being operative upon detecting that said present time of day value is at least equal to said future time of day value to generate signals for clearing a predetermined number of locations of said timer control section and said timer control and counter registers to zeros for processing another command specifying a time of day operation.

5. The system of claim 4 wherein said microprocessing means upon detecting that said present time of day value is less than said future time of day value is operative to generate signals for returning to a state for continuing execution of said time of day operation.

6. The system of claim 3 wherein said one command is coded to specify a repetitive time of day operation, said predetermined one of said plurality of timer control sequences including instructions which upon being read out from said read only memory means condition said microprocessing means to compare each of the bytes of said time of day value stored in said first buffer with a corresponding one of said bytes of the future time of day value stored in said second buffer, said microprocessing means being operative upon detecting said present time of day value is at least equal to said future time of day value to load a new future time of day value into said second buffer generated from the interval value stored in said third buffer and said present time of day value read from said counter for continuing the execution of said one command.

7. The system of claim 6 wherein said interval value stored in said third buffer corresponds to said predetermined information received from said controller for accurately defining successively generated intervals.

8. The system of claim 2 wherein a group of said plurality of locations of said read only memory corresponds to a task table, different ones of said group of said plurality of locations storing constant values defining which one of said plurality of timer control sequences is to be referenced to process said one command and each of said plurality of timer control sequences includes instructions containing values for defining said timer mode of operation for a selected one of said timer circuits.

9. The system of claim 8 wherein said microprocessing means in response to said one command references a first predetermined one of said group of locations of said task table to read out a first constant value specifying a single time of day operation for said timer module means and said micrprocessing means in response to said first constant value being operative to load said time of day information signals into said second buffer for subsequent comparison with time of day values obtained from said free running time of day means at intervals specified by said timer module means for detecting said completion of said time of day operation.

10. The system of claim 8 wherein said microprocessing means in response to said one command references a second predetermined one of said group of locations of said task table to read out a second constant value specifying a repetitive time of day operation for said timer module means and said microprocessing means in response to said second constant value being operative to load said time of day information signals into said third buffer and generate a future time of day value by combining said time of day information signals and a time of day value read from said interval buffer and from said free running time of day means for storage in said second buffer for subsequent comparison with time of day values obtained from said free running time of day means at intervals specified by said timer module means for detecting said completion of said time of day operation.

11. The system of claim 10 wherein said microprocessing means is operative upon detecting that one of the time of day values is at least equal to said future time of day value to generate a new time of day value by combining said time of day information signals and said one time of day values for storage in said second buffer for detecting subsequent completions of said time of day operations at intervals specified by said time of day information signals.

12. A data processing system including a central processing unit and a controller coupled in common to a bus, said controller having a number of ports connected to a corresponding number of adapter units, one of said adapter units comprising:

a data bus;

an address bus;

microprocessing means coupled to receive task word commands from said controller coded to specify a number of time of day operations, each command including time of day information;

said microprocessing means being coupled to said data and address buses;

random access memory means coupled to said data and address buses, said memory means being organized into a plurality of sections, each section having a plurality of locations, a first section corresponding to a transfer buffer for storing a present time of day value, a second section corresponding to a future buffer for storing a future time of day value specifying the time for completion of said time of day operation and a third section corresponding to an interval buffer for storing a time of day interval and a fourth section corresponding to a timer control section for storing timer mode and interval signals;

a programmable read only memory means coupled to said data and address buses, said memory means including a plurality of locations for storing a plurality of timer control sequences for processing different ones of said commands;

free running time of day counter means for generating and storing time of day values for transfer to said transfer buffer during the execution of each command, said means being coupled to said data bus and operatively coupled to said address bus; and, timer module means coupled to said microprocessing means and to said data and address buses, said module means including a number of programmable cyclic timer circuits each including control and counter registers operatively coupled to said address and data buses, a specified one of said timer circuit control and counter registers storing signals received from said timer control section corresponding to said timer mode and interval signals;

said timer module means being operative to generate an interrupt at the end of said predetermined interval to said microprocessing means and said microprocessing means being operative in response to said interrupt to compare each of the bytes of the time of day value obtained from said free running time of day means and stored in said transfer buffer with a corresponding one of said bytes of said future time of day value stored in said future buffer for detecting the completion of said time of day operation specified by the command being executed by said adapter.

13. The system of claim 12 wherein said free running time of day counter means is being updated at a predetermined millisecond rate, said predetermined time of day information being codable into values representative of the year, month, day, hours and seconds and said predetermined time interval corresponding to a value no greater than said predetermined millisecond rate.

14. The system of claim 12 wherein said free running time of day counter means includes:
a binary counter for generating a time of day value;
free running clock circuit coupled to said binary counter for generating clock signals for updating said time of day value stored in said counter at a millisecond rate;
an output latch register coupled to said counter and to said data bus; and
decoder circuit means coupled to said data bus and to said latch register, said microprocessing means in response to said interrupt being operative to reference a predetermined one of said plurality of timer control sequences for generating signals on said address and data buses for storing in said output latch register the present time of day value read from said binary counter and for transferring said present time of day value into said transfer buffer for detecting said completion of said time of day operation specified by said one command.

15. The system of claim 14 wherein said one command is coded to specify a single time of day operation, said predetermined one of said plurality of timer control sequences including instructions which upon being read out from said read only memory means condition said microprocessing means to compare each of the bytes of said time of day value stored in said transfer buffer with a corresponding one of said bytes of the time of day value stored in said future buffer, said microprocessing means being operative upon detecting that said present time of day value is at least equal to said future time of day value to generate signals for clearing a predetermined number of locations of said timer control section and said timer control and counter registers to zeros for processing another command specifying a time of day operation.

16. The system of claim 15 wherein said microprocessing means upon detecting that said present time of day value is less than said future time of day value is operative to generate signals for returning to a state for continuing execution of said time of day operation.

17. The system of claim 14 wherein said one command is coded to specify a repetitive time of day operation, said predetermined one of said plurality of timer control sequences including instructions which upon being read out from said read only memory means condition said microprocessing means to compare each of the bytes of said time of day value stored in said transfer buffer with a corresponding one of said bytes of the time of day value stored in said future buffer, said microprocessing means being operative upon detecting said present time of day value is at least equal to said future time of day value to load a new future time of day value into said future buffer generated from the interval value stored in said interval buffer and said present time of day value read from said counter for continuing the execution of said one command.

18. The system of claim 17 wherein said interval value stored in said interval buffer corresponds to said predetermined information received from said controller for accurately defining successively generated intervals.

19. The system of claim 12 wherein a group of said plurality of locations of said read only memory corresponds to a task table, different ones of said group of said plurality of locations storing constant values defining which one of said plurality of timer control sequences is to be referenced to process said one command and each of said plurality of timer control sequences includes instructions containing values for defining said timer mode of operation for a selected one of said timer circuits.

20. The system of claim 19 wherein said microprocessing means in response to said one command references a first predetermined one of said group of locations of said task table to read out a first constant value specifying a single time of day operation for said timer module means and said microprocessing means in response to said first constant value being operative to load said time of day information signals into said future buffer for subsequent comparison with time of day values obtained from said free running time of day means at intervals specified by said timer module means for detecting said completion of said time of day operation.

21. The system of claim 19 wherein said microprocessing means in response to said one command references a second predetermined one of said group of locations of said task table to read out a second constant value specifying a repetitive time of day operation for said timer module means and said microprocessing means in response to said second constant value being operative to load said time of day information signals into said interval buffer and generate a future time of day value by combining said time of day information signals and a time of day value read from said interval buffer and said free running time of day means for storage in said future buffer for subsequent comparison with time of day values obtained from said free running time of day means at intervals specified by said timer module means for detecting said completion of said time of day operation.

22. The system of claim 21 wherein said microprocessing means is operative upon detecting that one of the time of day values is at least equal to said future time of day value to generate a new time of day value by combining said time of day information signals and said one time of day values for storage in said future buffer for detecting subsequent completions of said time of day operations at intervals specified by said time of day information signals.

23. A data processing system including a central processing unit and a controller coupled in common to a bus, said controller having a number of ports connected to a corresponding number of adapter units, one of said adapter units comprising:
a microprocessing section coupled to receive commands from said controller coded to specify a number of time of day operations and including time of day values, said section including:
a data bus;
an address bus;

microprocessing means coupled to said data and address buses;

random access memory means coupled to said data and address buses, said memory means being organized into a plurality of sections, each section having a plurality of locations, a first section corresponding to a transfer buffer, a second section corresponding to a future buffer and a third section corresponding to an interval buffer and a fourth section corresponding to a timer control section; and, a programmable read only memory means coupled to said data and address buses, said memory means including a plurality of locations for storing a plurality of timer control sequences for processing different ones of said commands;

a time of day counter section including:
free running counter means for generating time of day values;
free running clock circuit means coupled to said counter means for generating clock signals for updating said time of day values at a predetermined rate; and,
output latch register means coupled to said counter means and to said data bus for storing time of day values to be transferred to said transfer buffer;

timer module means coupled to said microprocessing means and to said data and address buses, said module means including a number of programmable cyclic timer circuits each including control and counter registers operatively coupled to said address and data buses;

said microprocessing means being operative in response to one of said task commands to reference a first predetermined one of said plurality of timer control sequences for generating signals to load a predetermined time of day value received from said controller into a selected one of said buffers and for generating signals on said address and data bus lines for loading said timer control and counter registers of one of said timer circuits with signals read from said fourth section specifying a timer mode of operation and a predetermined time interval in accordance with said one command, said timer module means being operative to generate an interrupt at the end of said predetermined interval to said microprocessing means for detecting whether the time of day operation specified by said one command has been completed.

24. The system of claim 23 wherein said predetermined rate corresponds to a one millisecond rate, said predetermined time of day information being codable into values representative of the year, month, day, hours and seconds and said predetermined time interval corresponding to a value no greater than said predetermined one millisecond rate.

25. The system of claim 24 wherein said one command is coded to specify a single time of day operation, said predetermined one of said plurality of timer control sequences including instructions which upon being read out from said read only memory means condition said microprocessing means to compare each of the bytes of said time of day value read from said time of day counter section and stored in said transfer buffer with a corresponding one of said bytes of the future time of day value stored in said future buffer, said microprocessing means being operative upon detecting that said present time of day value is at least equal to said future time of day value to generate signals for clearing a predetermined number of locations of said timer control section and said timer control and counter registers to zeroes for processing another command specifying a time of day operation.

26. The system of claim 24 wherein said one command is coded to specify a repetitive time of day operation, said predetermined one of said plurality of timer control sequences including instructions which upon being read out from said read only memory means condition said microprocessing means to compare each of the bytes of said time of day value read from said time of day counter section and stored in said transfer buffer with a corresponding one of said bytes of the time of day value stored in said future buffer, said microprocessing means being operative upon detecting said present time of day value is at least equal to said future time of day value to load a new future time of day value into said future buffer generated from the interval value stored in said interval buffer and said present time of day value read from said counter section for continuing the execution of said one command.

27. The system of claim 26 wherein said interval value stored in said interval buffer corresponds to said predetermined information received from said controller for accurately defining successively generated intervals.

28. The system of claim 23 wherein a group of said plurality of locations of said read only memory corresponds to a task table, different ones of said group of said plurality of locations storing constant values defining which one of said plurality of timer control sequences is to be referenced to process said one command and each of said plurality of timer control sequences includes instructions containing values for defining said timer mode of operation for a selected one of said timer circuits.

29. The system of claim 28 wherein said microprocessing means in response to said one command references a first predetermined one of said group of locations of said task table to read out a first constant value specifying a single time of day operation for said timer module means and said microprocessing means in response to said first constant value being operative to load said time of day information signals into said future buffer for subsequent comparison with time of day values obtained from said time of day counter section at intervals specified by said timer module means for detecting said completion of said time of day operation.

30. The system of claim 28 wherein said microprocessing means in response to said one command references a second predetermined one of said group of locations of said task table to read out a second constant value specifying a repetitive time of day operation for said timer module means and said microprocessing means in response to said second constant value being operative to load said time of day information signals into said interval buffer and generate a future time of day value by combining said time of day information signals and a time of day value read from said interval buffer and from said time of day counter section for storage in said future buffer for subsequent comparison with time of day values obtained from said time of day counter section at intervals specified by said timer module means for detecting said completion of said time of day operation.

31. The system of claim 30 wherein said microprocessing means is operative upon detecting that one of the time of day values is at least equal to said future time of day value to generate a new time of day value by combining said time of day information signals and said one time of day values for storage in said future buffer for detecting subsequent completions of said time of day operations at intervals specified by said time of day information signals.

* * * * *